United States Patent
Zhang et al.

(10) Patent No.: US 7,230,738 B2
(45) Date of Patent: Jun. 12, 2007

(54) SYSTEM FOR SPECTRAL MULTIPLEXING OF SOURCE IMAGE TO PROVIDE A COMPOSITE IMAGE WITH NOISE ENCODING TO INCREASE IMAGE CONFUSION IN THE COMPOSITE IMAGE, FOR RENDERING THE COMPOSITE IMAGE, AND FOR SPECTRAL DEMULTIPLEXING OF THE COMPOSITE IMAGE

(75) Inventors: Yeqing (Juliet) Zhang, Penfield, NY (US); Gaurav Sharma, Webster, NY (US); Robert P. Loce, Webster, NY (US); Steven J. Harrington, Webster, NY (US)

(73) Assignee: Xerox Corporation, Stamford, CT (US)

(*) Notice: Subject to any disclaimer, the term of this patent is extended or adjusted under 35 U.S.C. 154(b) by 1003 days.

(21) Appl. No.: 10/268,241

(22) Filed: Oct. 9, 2002

(65) Prior Publication Data
US 2004/0071365 A1    Apr. 15, 2004

(51) Int. Cl.
G06F 15/00 (2006.01)
G06K 1/00 (2006.01)
H04N 1/60 (2006.01)

(52) U.S. Cl. ........................ 358/1.9; 382/284
(58) Field of Classification Search ............. None
See application file for complete search history.

(56) References Cited

U.S. PATENT DOCUMENTS

| | | |
|---|---|---|
| 3,234,663 A | 2/1966 | Ferris et al. ............... 35/2 |
| 3,969,830 A | 7/1976 | Grasham .................. 35/2 |
| 4,290,675 A | 9/1981 | Beiser .................... 354/112 |
| 4,586,711 A | 5/1986 | Winters et al. ........... 273/138 R |
| 4,824,144 A | 4/1989 | Tasma ................... 283/87 |
| 5,371,627 A | 12/1994 | Baccei et al. ............ 359/462 |
| 5,398,131 A | 3/1995 | Hall et al. ............... 359/465 |
| 5,483,363 A * | 1/1996 | Holmes et al. ........... 359/2 |
| 5,491,646 A * | 2/1996 | Erskine ................. 382/154 |
| 5,594,841 A | 1/1997 | Schutz .................. 395/119 |
| 5,715,316 A | 2/1998 | Steenblik et al. ......... 380/54 |
| 6,301,044 B1 | 10/2001 | Huber et al. ............ 359/483 |
| 6,333,757 B1* | 12/2001 | Faris .................... 348/60 |
| 6,891,959 B2* | 5/2005 | Reed et al. ............. 382/100 |
| 7,027,659 B1* | 4/2006 | Thomas ................. 382/254 |

OTHER PUBLICATIONS

Article entitled "Light Sources", pp. 151-176, from the book entitled The Reproduction of Colour in Photography, Printing & Television, Fourth Edition, by Dr. R. W. G. Hunt.
Article entitled "An Introduction To Appearance Analysis", pp. 1-7, from the publication of "SECONDSIGHT", SS No. 84, A reprint from GAFTWorld, the magazine of the Graphic Arts Technical Foundation, by Richard W. Harold.

* cited by examiner

Primary Examiner—Twyler Lamb
Assistant Examiner—Benjamin Dulaney
(74) Attorney, Agent, or Firm—Mark Z. Dudley

(57) ABSTRACT

Methods and apparatus for spectrally-encoding plural source images and for providing the spectrally-encoded plural source images in a composite image, for rendering the composite image in a physical form, or for recovering at least one of the encoded source images from the rendered composite image such that the recovered source image is made distinguishable. A noise component is introduced in the encoding of the plurality of source images so as to mask at least one of the source images during spectral demultiplexing.

26 Claims, 8 Drawing Sheets

SYSTEM FOR SPECTRAL MULTIPLEXING OF SOURCE IMAGE TO PROVIDE A COMPOSITE IMAGE WITH NOISE ENCODING TO INCREASE IMAGE CONFUSION IN THE COMPOSITE IMAGE, FOR RENDERING THE COMPOSITE IMAGE, AND FOR SPECTRAL DEMULTIPLEXING OF THE COMPOSITE IMAGE

CROSS-REFERENCE TO RELATED APPLICATIONS

Cross-reference is made to the following contemporaneously filed, co-pending, and commonly-owned applications:

U.S. application Ser. No. 10/268,333, filed Oct. 9, 2002 by Gaurav Sharma et al. and respectively entitled "Systems for spectral multiplexing of source images to provide a composite image, for rendering the composite image, and for spectral demultiplexing of the composite image".

U.S. application Ser. No. 10/10/268,394 filed Oct. 9, 2002 by Steven J. Harrington et al. and respectively entitled "Systems for spectral multiplexing of source images to provide a composite image, for rendering the composite image, and for spectral demultiplexing of the composite image to animate recovered source images".

U.S. application Ser. No. 10/268,295 filed Oct. 9, 2002 by Steven J. Harrington et al. and respectively entitled "Systems for spectral multiplexing of source images including a stereogram source image to provide a composite image, for rendering the composite image, and for spectral demultiplexing of the composite image".

U.S. Application Ser. No. 10/268,505 filed Oct. 9, 2002 by Steven J. Harrington et al. and respectively entitled "Systems for spectral multiplexing of source images including a textured source image to provide a composite image, for rendering the composite image, and for spectral demultiplexing of the composite image".

U.S. application Ser. No. 10/268,575 filed Oct. 9, 2002 by Gaurav Sharma et al. and respectively entitled "Systems for spectral multiplexing of source images to provide a composite image with gray component replacement, for rendering the composite image, and for spectral demultiplexing of the composite image".

U.S. application Ser. No. 10/268,246 filed Oct. 9, 2002 by Robert P. Loce et al. and respectively entitled "Systems for spectral multiplexing of a source image and a background image to provide a composite image, for rendering the composite image, and for spectral demultiplexing of the composite images".

U.S. application Ser. No. 10/268,271 filed Oct. 9, 2002 by Yeqing Zhang et al. and respectively entitled "Systems for spectral multiplexing of source images to provide a composite image, for rendering the composite image, and for spectral demultiplexing the composite image, which achieve increased dynamic range in a recovered source image".

U.S. application Ser. No. 10/304,171 filed Nov. 25, 2002 by Gaurav Sharma et al. and respectively entitled "Systems for spectral multiplexing of source images to provide a composite image, for rendering the composite image, and for spectral demultiplexing of the composite image by use of an image capture device".

FIELD OF THE INVENTION

The present invention relates to a system or systems for spectrally multiplexing a plurality of source images so as to provide a composite image, rendering the composite image, and demultiplexing of such a composite image to recover one or more of the source images.

BACKGROUND OF THE INVENTION

Whereas light sources are visible by their own emitted light, objects and materials appear to the eye according to how they modify incident light. The sensation of the color of an object is evoked by the physical stimulation of light-sensitive receptors in the human retina. The stimulation consists of electromagnetic radiation in the visible spectrum comprising wavelengths between about 380 and 780 nanometers.

Perceived color of the object is the result of a combination of factors, such as: (1) the spectral power distribution of an illuminant emitted by a light source that is incident upon the object, (2) the modification of the spectral power distribution of the illuminant by the spectral reflectance or transmission characteristics of the illuminated object, (3) the excitation of light sensitive receptors in the eye by the modified light from the object, and (4) the perception and interpretation by the brain of signals produced by the light sensitive receptors.

The perception of color is attributed to the differing spectral sensitivities of the light sensitive receptors. The trichromacy of color sensation implies that many different spectral distributions can produce the same perceived color. Such equivalent stimuli, which produce the same perception even though they are physically different spectral distributions, are called metamers, and the phenomena metamerism. For example, it is known that the perceived color of an object can change quite markedly when the object is moved from incident daylight into incident artificial light. The spectrum of the illuminating light source is also known to have an effect on the perceived colors of a printed image in spite of the considerable physiological compensation that the eye makes for differences in illumination. Light sources of differing relative spectral power distributions are therefore known to have different color rendering properties; for example, light sources which emit very narrow band, or almost monochromatic, light are considered to render colors very poorly.

According to the concept of metamerism, the respective colors of two objects may appear to be identical even though typically the spectral power distributions produced from the objects are different. Such power distributions, or stimuli, which are spectrally different but visually identical, are considered as metameric pairs. Because we measure light using only three cone types, the differences in these power distributions are indistinguishable. Two objects with different spectral reflectance functions may be perceived to match in color under one illuminant and not match under a different illuminant.

Certain aspects of perceived color have been employed to disguise images by printing an image in one color and then overprinting the first image with a pattern in a different color having approximately the same apparent brightness. Adjacent zones of equal brightness appear to be visually blended, even though they are of differing colors, thereby confusing the perception of the original image.

It is known to print patterns in different colors such that the patterns may be viewed through one or more filters having certain correlated colors, such that the patterns will change, depending upon the colors involved. It is also known to print characters in different colors in an overlapping relationship such that the overlapped characters, when viewed through one colored filter, will give the appearance of only certain ones of the superimposed characters, and when viewed through a second and differing colored filter, will reveal certain other ones of the superimposed characters. Such approaches are known for encoding (or encrypting) information to prevent recognition of the information content of the pattern until the pattern is decoded and made comprehensible. These approaches have been applied to promotional gaming technology and in document security and document verification applications.

Techniques are known for rendering flat, two-dimensional images that can stimulate an illusion of depth perception, that is, of a three-dimensional object or scene. Three-dimensional imaging can be classified into two major groups according to the quantity of information required to record the images: (1) binocular stereoscopic imaging, and (2) autostereoscopy, or three-dimensional spatial imaging. See Takanori Okoshi, Three-dimensional Imaging Techniques, Academic Press Inc., New York, (1976). Devices for performing binocular stereoscopic imaging include binocular viewers, parallax stereograms, lenticular-sheet binocular stereoscopic pictures, and binocular displays using Polaroid glasses or color filters. Devices for performing autostereoscopy include parallax panoramagrams, lenticular-sheet three-dimensional imaging, projection type three-dimensional displays, and integral photography.

In stereoscopy, a three-dimensional image is created by a series of two-dimensional images of an object captured from different perspectives, and therefore the three-dimensional image so produced contains multiple-angle information about the object. Physically displaced views of the same image are presented simultaneously to the eyes of an observer to convey the illusion of depth. These techniques typically employ a multiplexed pair of images, wherein the images are nearly identical and differ only so as to simulate parallax. The multiplexing is performed according to color, polarization, temporal, or position differences between the constituent images. For example, anaglyphic stereoscopy is a well-known process, in which left and right nearly-identical images are color-encoded by use of respective complementary color filters (e.g. cyan and red) for subsequent viewing through correspondingly colored lenses to separate the images as necessary for a simulated three-dimensional effect. When viewed through colored spectacles, the images merge to produce a stereoscopic sensation. The encoded image pair is known as an anaglyph, as it is typically rendered as two images of the same object taken from slightly different angles in two complementary colors.

This stereoscopic viewing of the multiplexed image pair typically requires the use of optical devices to channel each of the paired (left and right) images solely to the appropriate eye of the observer. A few autostereoscopic display techniques are known for providing subjectively three-dimensional viewing of a fixed image plane, without resort to eyewear and the like, by use of alternative devices based upon direction-multiplexed image displays. These devices typically employ optical diffraction, lenticular imaging, or holographic phenomena.

SUMMARY OF THE INVENTION

Spectral multiplexing, as used herein, refers to a process for encoding plural source images in a composite image. Composite image rendering refers to a process for rendering the composite image in a physical form. Spectral demultiplexing refers to a process for recovering at least one of the encoded source images from the rendered composite image, such that the recovered source image is made distinguishable from, or within, the composite image, by subjecting the rendered composite image to a narrow band illuminant that is preselected to reveal the source image.

Accordingly, the present invention is directed to methods and apparatus for spectrally-encoding plural source images and for providing the spectrally-encoded plural source images in a composite image, for rendering the composite image in a physical form, or for recovering at least one of the encoded source images from the rendered composite image such that the recovered source image is made distinguishable. That is, when the rendered composite image is subjected to illumination by one of the narrow band illuminants for which a source image was encoded, the source image becomes visually detectable by an observer. An illuminant that is designed to particularly interact with a given colorant is said to be complementary, and vice versa.

Each source image is spectrally encoded by mapping values representative of each source image pixel to a corresponding pixel value in one or more of a plurality of colorant image planes. The contemplated encoding, in its simplest form, may include the conversion of each source image to a monochromatic, separation image, which is then directly mapped to a corresponding colorant image plane in the composite image. A plurality of source images can thereby be mapped to a corresponding plurality of colorant image planes in the composite image.

The plural monochromatic separations are designed to be combined in the composite image, which in turn will control the amount of one or more preselected colorants to be deposited on the substrate. In one possible example, each colorant is assigned to a respective colorant image plane of the composite image, and the colorant values in the respective colorant image planes represent the relative amounts of colorant deposited in the rendered composite image. For example, a rendered composite image may be rendered using cyan, magenta and yellow colorants that are deposited over a given area on a substrate by a rendering device.

A composite image composed of the plural colorant image planes may be stored or transmitted as composite image file. The composite image may then be physically realized by delivering the composite image file to a rendering device with instructions for rendering the composite image on a substrate using the identified colorant or array of colorants. One suitable embodiment of a rendering device therefore includes a digital color electrophotographic printer.

In another embodiment of the contemplated encoding, the mapping of each source image is instead performed according to determinations described herein for compensating the effect of one or more of the following on the composition, rendering, or demultiplexing of the composite image: (a) the trichromacy of human visual response to colorant/illuminant interaction; (b) the spectral characteristics of the colorants selected for rendering the composite image, such spectral characteristics especially comprehending the interaction of plural colorants when such are combined on the substrate, and (c) the spectral characteristics of the narrow band illuminant(s) that will be used to illuminate the composite image for recovering the source image.

It will no doubt be appreciated that the encoding of source images to the composite image may be accomplished according to the teachings herein with use of either software, hardware or combination software-hardware implementations.

Accordingly, the present invention is directed to a system for spectrally-encoding plural source images and for providing the spectrally-encoded plural source images in a composite image.

The present invention is also directed to a system for rendering a spectrally-multiplexed composite image on a substrate.

The present invention is also directed to a system for spectral demultiplexing of a source image presented in a composite image presented on a substrate.

In a feature of the present invention, the source image presented in a rendered composite image is recovered when the composite image is illuminated by a controlled field of illumination of at least one narrow band illuminant having a selected spectral power distribution.

In another feature of the present invention, source image data representative of a plurality of disparate, pictorial source images may be spectrally encoded to form secondary image data representative of a composite image. The composite image may be realized as a single, complex, rendered pattern of deposited colorants, wherein at least one colorant is utilized for its particular spectral reflectance characteristic, and in particular for its narrow band absorption characteristic. The source images are accordingly spectrally multiplexed to provide a composite image which is recorded on the substrate by use of at least one of the narrow band-absorbing colorants. Typically, at least one of the source images is not easily recognized as such in the rendered composite image. That is, until the rendered composite image is subjected to the demultiplexing process, the rendered composite image is, to a certain extent, visually confused such that an observer is substantially unable to discern one or more of the source images by unaided viewing of the rendered composite image. Alternatively, one or more of the source images may be encoded so as avoid or reduce visual confusion and therefore be visually apparent in the rendered composite image when the rendered composite image is subjected to ambient white light or another wide band illuminant, and become confused or difficult to detect when the rendered composite image is subjected to a complementary narrow band illuminant.

In another feature of the present invention, a colorant selected for its narrow band absorbing properties may be employed to appear dark when subjected to its complementary narrow band illuminant, and to appear light when subjected to a differing illuminant having a spectral power distribution that lies substantially outside of the spectral absorption band of the particular colorant. For example, a cyan colorant may be selected for its absorption of red light, and accordingly the regions of a rendered composite image that are composed of a cyan colorant will exhibit high darkness under red light. The cyan colorant will exhibit low darkness under blue light, and will exhibit intermediate darkness under green light. Likewise, a magenta colorant will exhibit high darkness under green light, low darkness under red light, and an intermediate darkness under blue light. A yellow colorant will exhibit high darkness under blue light, low darkness under red light, and an intermediate darkness under green light.

In another feature of the present invention, by using cyan, magenta, and yellow colorants and narrow band red, green, blue illuminants, three source images may be encoded and rendered using each of the respective colorants, and each of the corresponding source images are distinguishable within the rendered composite image when the rendered composite image is subjected to illumination by the red, green, and blue illuminants.

An embodiment of the system for spectral multiplexing of plural source images includes a spectral multiplexer for receiving image data representative of a plurality of source images and for processing the image data to encode the plurality of source images into a composite image data signal.

An embodiment of the spectral multiplexer may be provided in the form of a computer for receiving image data files representative of a plurality of source images and for encoding the image data files as a composite image data file, and a composite image file storage and/or transmission means connected to the computer.

An embodiment of the system for rendering the composite image includes an image recording device which is responsive to the system for spectral multiplexing for receiving the composite image data file and for rendering the corresponding composite image on a substrate.

An embodiment of the image recording device may be provided in the form of a printer connected to the composite image file storage and/or transmission means, for printing the composite image on a substrate.

An embodiment of the printer may include colorants in the form of cyan, yellow, and black pigments, inks, or dyes selected for their apparent darkness when exposed to at least one of red and blue illuminants, or colorants in the form of cyan, magenta, and black pigments, inks, or dyes selected for their apparent darkness when exposed to at least one of red and green illuminants.

An embodiment of the system for spectral demultiplexing of a rendered composite image may include a demultiplexer for subjecting the rendered composite image on a substrate to illumination by a narrow band illuminant having a selected spectral power distribution, such that at least one of the encoded source images is made distinguishable.

An embodiment of the demultiplexer may include an illuminant source responsive to manual control, or a controller and an illuminant source responsive to control by illuminant source control signals provided by the controller. An embodiment of the illuminant source may include one or more light sources for providing a defined field of red, green, or blue light.

An embodiment of the controller may include a computer, operable according to control programs for generating one or more of the illuminant source control signals, and an illuminant source responsive to the illuminant source control signals for generating a defined field of illumination of narrow band illuminant, whereby a rendered composite image on a substrate may be located within the field of illumination and thereby subjected to illumination by the narrow band illuminant.

In another embodiment of the invention, a noise component is introduced in the encoding of the plurality of source images so as to mask (i.e., reduce the detectability of) at least one of the source images during spectral demultiplexing. Typically, the masked source image is a residual image, i.e., a source image other than the source image intended to be recovered when the rendered composite image is subjected to a predefined complementary illuminant. The addition of a noise component to the encoding process is particularly advantageous when the source image to be recovered exhibits a relatively large uniform region, wherein artifacts of a residual source image may be more noticeable when the composite image is subjected to a predefined viewing illuminant.

In one embodiment with the present invention, a noise component may be added to one or more of the source images or to the composite image during spectral multiplexing. For example, a noise signal can be added to the illuminance or lightness channel of image data representative of one or more of the source images to be encoded in the composite image. Alternatively, a source image, provided in the form of a noise image, may be included in the plurality of source images to be encoded. One example of a source image provided in the form of the noise image is a white noise image. Alternatively, the frequency content or complexity of the noise image may be, for example, exhibit a spectral profile similar to the source image to be masked.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE INVENTION

Definitions of Terms

Figure 1:
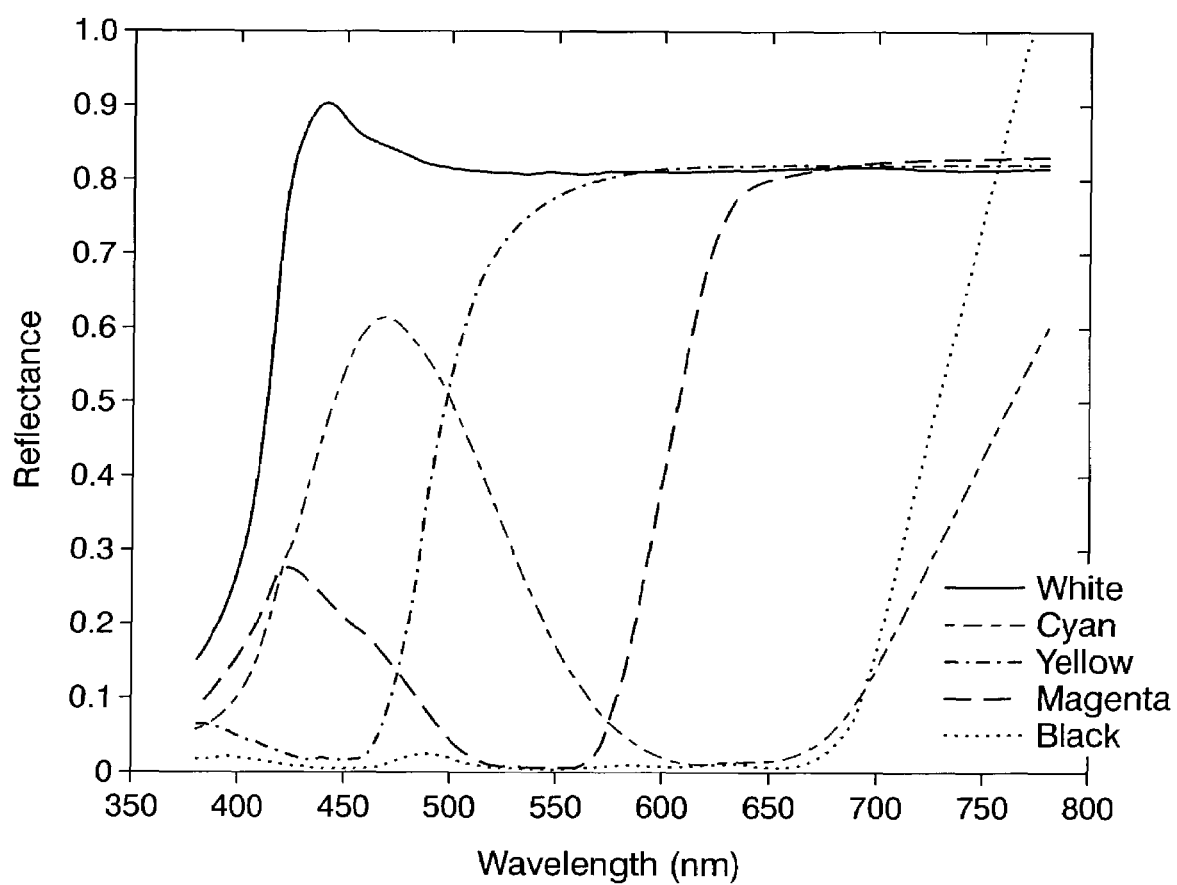
FIG. 1 represents reflectance spectra for a white paper substrate and colorants in the form of Cyan, Magenta, Yellow, and Black dyes (at 100% density) operable in a dye sublimation printer.

Color—A color can be uniquely described by three main perceptual attributes: hue, denoting whether the color appears to have an attribute according to one of the common color names, such as red, orange, yellow, green, blue, or purple (or some point on a continuum); colorfulness, which denotes the extent to which hue is apparent; and brightness, which denotes the extent to which an area appears to exhibit light. Light sources used to illuminate objects for viewing are typically characterized by their emission spectrum and to a reduced degree by their color temperature, which is primarily relevant for characterization off sources with a spectrum similar to a black body radiator. See, for instance, Hunt, R. W. G., *Measuring Colour*, Ellis Horwood, 1991, and Billmeyer and Saltzman, *Principles of Color Technology*, 3rd Ed. (Roy S. Berns), John Wiley & Sons, 2000.

Chroma—Colorfulness of an area judged as a proportion of the brightness of a similarly illuminated area that appears white or transmitting.

Colorant—A dye, pigment, ink, or other agent used to impart a color to a material. Colorants, such as most colored toners, impart color by altering the spectral power distribution of the light they receive from the incident illumination through two primary physical phenomenon: absorption and scattering. Color is produced by spectrally selective absorption and scattering of the incident light, while allowing for transmission of the remaining light. A narrow band (absorbing) colorant exhibits an absorption band that is situated in a substantially narrow region of the visible region of the spectrum. Cyan, magenta and yellow colorants are examples of narrow band colorants that selectively absorb red, green, and blue spectral regions, respectively. Some colorants, such as most colored toners, impart color via a dye operable in transmissive mode. Other suitable colorants may operate in a reflective mode.

Composite Image—An array of values representing an image formed as a composite of plural overlaid (or combined) colorant image planes. Source images may be encoded as described herein and the resulting image planes are combined to form a composite image. When a rendered composite image is subjected to a narrow band illuminant, the combined density of all colorants in the rendered composite image will reveal at least one source image that is otherwise difficult to distinguish, or the reverse, depending upon the specific colorant/illuminant interaction.

Density (Optical)—The degree of darkness of an image. Higher density values represent greater darkness. Mathematically, optical density is defined as the negative logarithm of the reflectance or transmittance. The spectral density is correspondingly the negative logarithm of the reflectance/transmittance spectrum.

Hue—Attribute of visual sensation according to which an area appears to be similar to one of the perceived colors: red, green, yellow, and blue, or to a combination thereof. An achromatic color is a perceived color devoid of hue and a chromatic color is a perceived color possessing a hue. See, for instance, Fairchild, Mark D., *Color Appearance Models*, Addison Wesley, 1998.

Gamut—A range of colors; typically, the range of colors that can be produced by a device.

Grayscale—Image data representing one of a series of tones stepped from light to dark.

Gray Component Replacement (GCR)—A technique whereby black ink is used to replace a portion of common darkness of component colorants.

Image—An image may be described as an array or pattern of pixels that are mapped in a two-dimensional format. The intensity of the image at each pixel is translated into a numerical value which may be stored as an array that represents the image. An array of numerical values representing an image is referred to as an image plane. Monochromatic or black and white (gray scale) images are represented as a two-dimensional array where the location of a pixel value in the array corresponds to the location of the pixel in the image. Multicolor images are represented by multiple two-dimensional arrays. In a three color arrangement, each array represents one of the primary colors. In the digital processing of color images, the individual color separations are represented as a digital image with a plurality of discrete elements ("pixels") defined by position and gray value. In such a system, gray value is described as one level in a number of possible states or levels. When more than two different levels are used in the description of an image, the levels are termed "gray" (without regard to the actual color) to indicate that the pixel value is between some maximum and minimum gray level.

Figure 2:
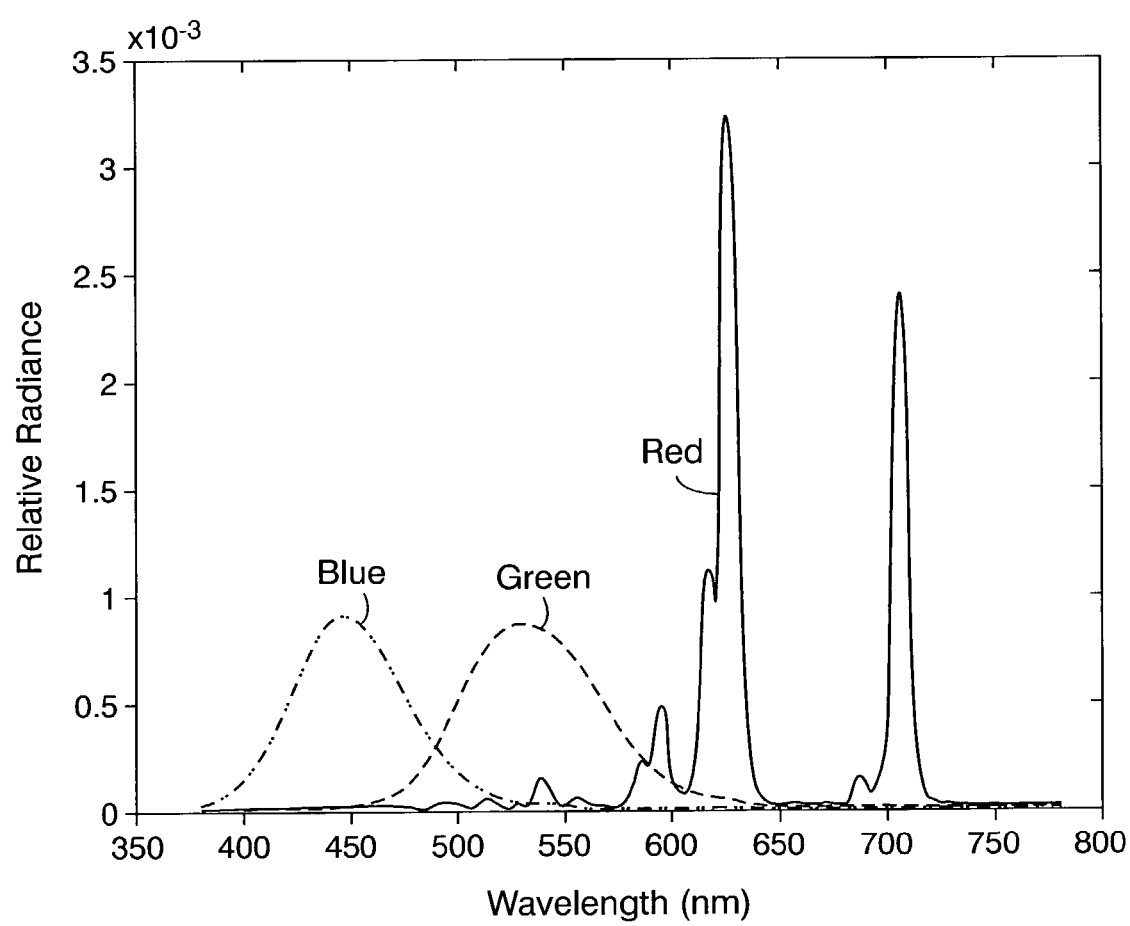
FIG. 2 represents the relative radiance spectra for the red, green, blue primaries generated by a typical cathode ray tube (CRT).

Illuminant—Incident luminous energy specified by its relative spectral power distribution; typically provided by a real or imaginary light source having a predefined spectral power distribution. A narrow band illuminant is an illuminant having a spectral power distribution that is substantially limited to a narrow region of the spectrum. The bandwidth of the region may vary from extremely narrow for a LASER source, to narrow band illuminants such as natural or artificial light transmitted through a band-limited color filter. Examples of red, green and blue narrow band illuminants are shown in FIG. 2, which illustrates the spectral power distributions obtained from activated red, green, and blue phosphors in a typical CRT.

Image plane—A two-dimensional representation of image data. The uppercase letters C, Y, M, K are used herein to indicate two-dimensional arrays of values representing a monochromatic image or a separable component of a polychromatic (multicolor) image. Two-dimensional arrays of values may also be referred to as "planes." For example, the Y plane refers to a two-dimensional array of values that represent the yellow component at every location (pixel) of an image.

Imaging Device—A device capable of generating, capturing, rendering, or displaying an image; including devices that store, transmit, and process image data. A color imaging device has the capability to utilize color attribute information.

Lightness—The perceptual response to luminance; denoted L* and is defined by the CIE as a modified cube root of luminance.

Primary Colors—Colors, usually three, which are combinable to produce a range of other colors within a color mixing model. All non-primary colors are mixtures of two or more primary colors. Red, green, and blue (R, G, B) are the standard additive primary colors. Cyan, magenta, and yellow (C,M,Y,K) are the standard subtractive primary colors. Black (K) colorant absorbs light energy substantially uniformly over the full extent of the visible spectrum and may be added to enhance color and contrast and to improve certain printing characteristics. Cyan, magenta, and yellow are the subtractive complements of red, green, and blue, respectively and they absorb the light energy in the long, middle, and short wavelength regions, respectively, of the visible spectrum, leaving other regions of the visible spectrum unchanged. Ideally, the absorption bands of individual CMY colorants are non-overlapping and completely cover the visible region of the spectrum. Actual CMY colorants do not satisfy these block-dye assumptions; instead, their absorption spectra are smooth and include some unwanted absorptions in their transmission bands. The reflectance spectra for white paper and cyan, magenta, yellow, and black colorants (100%) from a dye-sublimation printer are shown in FIG. 1. Red, green, and blue are the additive complements of cyan, magenta, and yellow respectively.

Saturation—Colorfulness of an area judged in proportion to its brightness. Saturation is judged for an area relative to its own brightness whereas chroma is judged relative to a similarly illuminated area that appears white.

Subtractive Color Model The production of color wherein light is subtracted through a process such as absorption; a color model in which colors may be produced by combining various percentages of the subtractive primaries (cyan, magenta, and yellow).

Introduction to a General Theory of the Invention

Two predominant modes for producing color are: Additive color, whereby color is produced by the addition of spectrally selective lights to a dark background that is otherwise substantially devoid of light; and subtractive color, whereby color is produced by spectrally selective subtraction of light energy from the light emitted by a source. Red, green and blue lights are typically used as the primaries that are mixed together in an additive system. In a subtractive system, colorants are typically used as the subtractive primaries. These colorants selectively absorb, or subtract, a portion of the visible spectrum of incident light while transmitting the remainder. Cyan, Magenta, and Yellow colorants are typically used.

Color in printed images results from the combination of a limited set of colorants deposited on a substrate over a small area in densities selected to integrate the desired color response. This is accomplished in many printing devices by reproducing so called "separations" of the image, where each separation provides varying gray values of a single primary color. When the separations are combined together, the result is a full color image.

Colorants that are deposited on a reflective substrate, such as a paper sheet, will selectively transmit incident light in a first pass to the surface of the substrate whereupon the transmitted light is then reflected by the substrate and is again filtered by the colorants in a second pass, thus encountering additional selective absorption before being perceptible as a particular color by an observer. It is also common for colorants to possess a degree of scattering, and the color appearance of a colorant on a printed substrate is determined by the amount and types of the colorants present, and the combination of their absorption and scattering properties.

In the practice of the invention, most colors in a subtractive color setting may be reproduced in an image by use of different proportions of cyan, magenta, and yellow colorants. Each of these colorants is characterized primarily by its absorption characteristics. An idealized cyan colorant, for instance, may be defined as having absorption band covering the wavelength interval 600-700 nm, commonly referred to as the red region of the spectrum. Likewise, an idealized magenta colorant has an absorption band covering the interval 500-600 nm, commonly referred to as the green region of the spectrum, and an idealized yellow colorant has an absorption band covering the interval 400-500 nm, commonly referred to as the blue region of the spectrum.

Thus, cyan, magenta, and yellow colorants absorb red, green and blue light, respectively. The idealized absorption bands for the cyan, magenta, and yellow colorants are referred to as the block-dye assumption. In reality, colorants exhibit significant deviations from this idealized behavior, including variations of absorption within the absorption band, extension of the absorption band beyond the idealized limits, and scattering in the colorants. In particular, the absorption of light in a spectral region outside the main absorption band of a colorant (as, for example, demonstrated by absorption in the blue and red regions of the spectrum by a magenta colorant), is considered unwanted absorption. Among typical colorants used for CMYK printing, magenta demonstrates the most unwanted absorptions and yellow the least. The black colorant absorbs uniformly through the visible region of the spectrum and can be used as a replacement for combined CMY for reasons of economy and improved rendition of dark regions.

Thus, according to the subtractive principle, a surface layer of a substrate such as a sheet of white paper, on which one can vary the concentrations of a cyan, a magenta, and a yellow colorant, thereby offers the means of varying the intensities of the reddish, greenish, and bluish parts of the white light reflected from the paper. To produce a subtractive color image reproduction, one can control the concentrations of the three colorants independently at localized areas on the paper substrate.

All surfaces, whether of a colorant or substrate, reflect from their topmost layer a certain proportion of the incident light which is added to that reflected from the body of the surface. This light reflected from the topmost layer is the same color as the illuminant, and therefore when a color surface is viewed in white light, some of the white light is added to the colored light reflected from the body of the surface and the colorfulness is therefore reduced. Most surfaces also exhibit some degree of gloss, and this means that, if the lighting is directional, the white light reflected from the topmost layer of the surface will be confined chiefly to a single direction, thus altering the appearance of the image to some extent depending on the angles of viewing and illumination.

Under normal viewing illumination, the eye adapts to the white-point, which usually corresponds to blank paper with the highest reflectance and different colors can be seen by the eye for prints made with different colorant combinations. However, under relatively narrow band illumination, such as that obtained from a phosphor excited by a single gun of a CRT monitor, the eye is unable to distinguish color. Images viewed under narrow band illumination therefore appear to have only varying levels of gray and little or no chroma. Since the absorption characteristics of each of a plurality of colorants will differ in different spectral bands, the respective reflectance (or density) of each colorant when subjected to a series of differing narrow band illuminants will also appear to have varying levels of gray.

The present invention accordingly exploits the interaction between certain narrow band illuminants and their corresponding (complementary) colorants (especially the colorants typically used for printing), and the manner in which the eye detects images illuminated with illuminants having narrow band spectral power distributions. The methodology described herein may be generalized to apply to an arbitrary number of illuminants and colorants, and for the purpose of simplicity the invention is described with reference to the cyan, magenta, yellow, and black colorants commonly used in color printing applications, and to the narrow band red, green, arid blue illuminants commonly generated by CRT-based light sources. This description thus makes reference to the handling of monochromatic and color source images encoded according to an array of colorants such as the CMYK color primaries. However, it will be apparent to one of ordinary skill in the art that there are alternative spectral schemes to be employed in the spectral multiplexing of the invention. An alternative would include a color system that employs primary colorants other than CMYK for color representations, such as systems that use RGB primaries or high-fidelity colorants such as orange and green. Still another alternative would be to employ the invention in a system that processes different types of multi-spectral data, such as source images encoded with respect to narrow band colorants responsive to illuminants generated from ultraviolet or infrared light sources.

As the present invention is directed to the multiplexing or demultiplexing of at least one source image encoded in a composite image, the composite image may be defined in a spectrally multiplexed (SM) image plane. This plane may have any number of different patterns of pixels, with a primary characteristic being that the plane is spectrally multiplexed. In general, at each location in the SM plane, a pixel value representing one or more spectral components may be present, and which spectral component is present depends on the gray level of the corresponding pixel in one of the source image planes. (The invention may also have applications to SM planes in which each pixel includes color values representative of color separation image data from more than one source image plane.)

The general theory of the Invention may be understood with reference to a rendering device in the form of a color hardcopy output device, such as a printer, and to a mathematical framework that employs nomenclature similar to that used in conventional color imaging. Consider a color hardcopy output device with M colorants. Prints from this device are to be viewed under N different illuminants. The luminance characterization of the output device under the N illuminants $\{L_i\}_{i=1}^{N}$ is given by the relation between the control values $\{A_j\}_{j=1}^{M}$ used for each of the M colorants at a given pixel location and the luminance produced at the given pixel location under each of the N illuminants. This can be denoted as the set of N functions, where i=1, 2, ... N:

$f_i(A_1, A_2, \ldots A_M)$=luminance of region with colorant control values $A_1, A_2, \ldots A_M$ under it illumination $L_i$ In the following description, we assume that a control value of 0 for a given colorant represents no printing of that colorant. This convention is not a requirement for the invention and is only adopted for notational simplicity.

The description herein is limited to the case of luminance characterization alone, because under narrow band illumination the eye primarily sees differences of luminance and is unable to distinguish most color differences. Note that luminance as described here agrees in concept with its standard usage, i.e., as a measure of the perceived light energy; however, it's definition is not limited to the conventional usage and is expanded to comprehend the special viewing situations also described herein. In particular, under narrow band illumination, specific visual effects may influence the perception of a source image. A specific instance of this is the Purkinje effect that causes increased sensitivity in the blue region of the spectrum at low light levels, which may be of particular relevance for viewing under blue light and CRT illumination in general. Some of the advanced concepts from photometry and colorimetry that are required in such situations are described for instance in G. Wyszecki and W. S. Stiles, *Color Science: Concepts and Methods, Quantitative Data and Formulae*, $2^{nd}$ Edition, John Wiley and Sons (1982).

The methods of the present invention are directed to the multiplexing, rendering, and recovery via demultiplexing of a source image encoded in a composite image. We assume that the one or more source images to be recovered are described by the spatial luminance distributions desired under each of the illuminants (although, in the alternative, any other equivalent specification that can be transformed to luminance/density may be used.) Thus, there are N images specified, with $Y_i(x,y)$ being the desired luminance values that we wish to produce under the ith illuminant $L_i$ where x,y denote the two spatial coordinates. For the purposes of simplifying the notation in the following discussion, the spatial dependence is sometimes dropped in the following description with the understanding that the discussion applies to each pixel location independently.

To examine the basic methodology symbolically, consider a simplified example of a composite image rendered in cyan and yellow colorants. In the simplified example below, additivity of "RGB" densities is assumed. This is for the purposes of simple illustration of the principles only and not intended to restrict the invention; in those situations where this approximation is invalid, more precise assumptions can be made. In this example: C, M, Y, K and R, G, B will respectively denote the colorants and illuminants; a superscript will denote illuminant; and a subscript will denote a colorant. Let:

$d^R$=density of the image perceived under R illumination,
$d^B$=density of the image under B,
$d_C^R$=density C separation under R,
$d_C^B$=density C separation under B,
$d_Y^R$=density Y separation under R,
$d_Y^B$=density Y separation under B.

When illuminated with a R or B illuminant, the total density perceived can be approximated as, $$d^R(x, y) = d_C^R(x, y) + d_Y^R(x, y) \approx d_C^R(x, y)$$

$$d^B(x, y) = d_C^B(x, y) + d_Y^B(x, y) \approx d_Y^B(x, y)$$

Accordingly, this methodology exploits the characteristically low density of a colorant when subjected to a first illuminant and the characteristically high density exhibited by the same colorant when subjected to a second, differing illuminant. Thus, at least one perceptibly distinct source image (that is encoded in the rendered composite image by use of the particular colorant), will be imperceptible (or nearly so) to an observer when subjected to the first illuminant, but perceptibly distinguishable to an observer when illuminated by the second illuminant. Upon perception of the source image by an observer, the source image may be comprehended and the information embedded in the composite image, or the composite image itself, is thereby readily comprehended.

Determinations of Gamut Mapping, Dynamic Range, and Colorant Interaction

The example presented above assumed that colorant interactions can be entirely ignored. This assumption is not true with most practical colorants and additional considerations are therefore required.

Consider the case of a rendered composite image that is produced by using C and M colorants for subsequent illumination under red and green illuminants. For simplicity, in our illustration below we assume additivity for the red, green, blue band densities, as the general case for situations where this approximation does not hold is described subsequently. A first source image may be recovered primarily from the cyan component of a composite image, and a second source image may be recovered primarily from the magenta component; however, unwanted absorption by these colorants are preferably compensated to avoid artifacts discernible by an observer. The total density under red illumination at pixel location (x,y) can be approximated as $$d^R(x,y) = d_C^R(x,y) + d_M^R(x,y)$$

and the total density under green illumination is $$d^G(x,y) = d_M^G(x,y) + d_C^G(x,y)$$

where $d_U^V(x,y)$ represents the visual density under illuminant V due to colorant U at pixel location (x,y).

The terms $d_M^R(x,y)$ and $d_C^G(x,y)$ represent the unwanted absorption. In the simplest case, it can be assumed that a colorant's absorption under its complementary illuminant is used for two purposes: 1) to recover the desired image and 2) to compensate for unwanted absorption by the other colorant(s) present in the composite image. So a magenta colorant may be used to produce the desired image to be seen under green illumination and to compensate for the unwanted absorption of the cyan colorant; a cyan colorant may be used to produce the desired image under red illumination and to compensate for unwanted absorption of magenta under red illumination.

The portion that is used to compensate for the unwanted absorption should combine with the unwanted absorption to result in a constant spatial density so as to make it "disappear". Let $d1_C^R(x,y)$ represent the portion of Cyan density that is used to compensate for the unwanted absorption of Magenta under red, which is determined by $$d1_C^R(x,y) + d_M^R(x,y) = \text{constant} = q^R$$

The remaining density contribution of Cyan under red illumination is $d2_C^R(x,y) = d_C^R(x,y) - d1_C^R(x,y)$. Note that the total density can be written in terms of these components as $$d^R(x,y) = d_C^R(x,y) + d_M^R(x,y) = d2_C^R(x,y) + (d1_C^R(x,y) + d_M^R(x,y)) = d2_C^R(x,y) + q^R$$

Therefore the overall visual density under red illumination corresponds a constant background density of $q^R$ with the spatially varying density pattern of $d2_C^R(x,y)$ superimposed. This spatially varying pattern is the one that is seen under red illumination and should therefore represent the first multiplexed image that is to be seen under red illumination.

In a similar manner the density contribution of magenta under green illumination can be decomposed into a component $d1_M^G(x,y)$ that is used to compensate for the unwanted absorption of cyan under green illumination, given by $$d1_M^G(x,y) + d_C^G(x,y) = \text{constant} = q^G$$

and the remaining component $$d2_M^G(x,y) = d_M^G(x,y) - d1_M^G(x,y)$$

which satisfies $$d^G(x,y) = d_M^G(x,y) + d_C^G(x,y) = d2_M^G(x,y) + d1_M^G(x,y) + d_C^G(x,y) = d2_M^G(x,y) + q^G$$

Therefore the overall visual density under green illumination corresponds to a constant background density of $q^G$ with the spatially varying density pattern of $d2_c^r(x,y)$ superimposed. This spatially varying pattern is the one that is seen under red illumination and should therefore represent the second multiplexed image that is to be seen under green illumination.

Since the terms $d2_C^R(x,y)$ and $d2_M^G(x,y)$ represent the visual variations in density corresponding to the two multiplexed images, we would like to maximize their dynamic range. Since colorants can only add positive density, this requirement translates to minimizing the terms $q^R$ and $q^G$ subject to meeting the required equations and the physical constraint that colorants can only add positive density. We would therefore like to determine the smallest feasible values of $q^R$ and $q^G$ for which the above equations are feasible.

For the purpose of further illustration we use a first order approximation, that the amount of colorant added to compensate for unwanted absorption of the other colorant, itself only contributes a negligible amount of unwanted absorption (because of its small value). This assumption implies that the component of Magenta used to offset unwanted absorption of Cyan contributes negligibly to unwanted absorption under green and the component of Cyan used to offset unwanted absorption of Magenta contributes negligibly to unwanted absorption under blue. This assumption is used for illustration only, in practice, one can iteratively determine the appropriate amounts to account for higher-order effects or use an appropriate model/LUT as outlined subsequently in this disclosure. With this simplifying assumption, the range achievable for the desired spatially varying pattern $d2_C^R(x,y)$ under red illumination is between $q^R$ and $d_C^R(x,y)$ with a total density variation or dynamic range of $d_C^R(x,y)-q^R$. Likewise the total density range available under green illumination is $d_M^G(x,y)-q^G$.

One set of feasible values for the terms $q^R$ and $q^G$ can be determined as:

$q^R = \max(d_M^R(x,y)) = d_M^R(255) =$ max density for Magenta under red illuminant $q^G = \max(d_C^G(x,y)) = d_C^G(255) =$ max density for Cyan under green illuminant This can be thought of as follows: the background density under red light $q^R$ is equal to the maximum unwanted density that one can have from Magenta. The Cyan density component $d1_C^R(x,y)$ is designed carefully so that the combination of Cyan and Magenta at each pixel has a density $q^R$, this can be achieved by putting no Cyan where Magenta is 100% (255 digital count) and appropriate amounts of Cyan to make up the density to $q^R$ at pixels which have less than 100% Magenta. A similar argument applies to the Magenta density component $d1_M^G(x,y)$ that compensates for the unwanted absorption of Cyan under red illumination.

With the notation and terminology defined earlier, the general multi-illuminant imaging problem reduces to the following mathematical problem:

Given N luminance values $\{Y_i\}_{i=1}^N$ corresponding to the desired luminance values under the N different illuminants, determine a set of control values for the M colorants $\{B_j\}_{j=1}^M$ to be used in printing a pixel, such that for all i=1,2, ... N:

$f_i(B_1, B_2, \ldots B_M)$ luminance of pixel under ith illumination $L_i = Y_i$ (1)

Typically, for N>M (number of image specifications>number of colorants) the system is over-determined and has a solution only under severe constraints on the $\{Y_i\}_{i=1}^K$ luminance values limiting its utility in illuminant multiplexed imaging. Even if N≦M (number of image specifications≦number of colorants), the system of N equations presented in (1) above has a solution (corresponding to realizable device control values $\{B_j\}_{j=1}^M$) only in a limited region of luminance values, which we refer to as the gamut for the spectrally multiplexed imaging problem:

G=gamut achievable for illuminant multiplexed imaging={Y∈R₊$^K$ such that system (1) has a realizable solution} (2)

where $Y=[Y_1,Y_2, \ldots Y_N]$, denotes the vector of luminance values under the N illuminants, and R₊ is the set of nonnegative real numbers. For specified N-tuples of luminance values within the gamut G, there is a set of realizable control values such that a pixel printed with the control values produces the required luminance values under the given illuminants. Vice versa, N-tuples of luminance values outside the gamut G cannot be created using any realizable control values. The situation is analogous to the limited color gamut encountered in color reproduction. It is necessary to include a gamut mapping step in the spectral multiplexing described herein to ensure that the source images are limited to the gamut of the system before attempting to reproduce them. The gamut mapping may be image independent or image dependent, where the term image is used to imply the set of desired source images recoverable under the different illuminants. In addition, the set of images to be multiplexed may be designed to take into account the gamut limitations and produce the best results with those gamut limitations.

Once the source images to be multiplexed have been mapped to the achievable gamut G, the problem of reproduction reduces to the determination of the control values for each of the M colorants for each pixel. This corresponds to an inversion of the system of equations in (1) and in a manner similar to color calibration, the inverse could be pre-computed and stored in N-dimensional look-up tables (LUTs), with one LUT per colorant (or alternately, a single N-dimensional LUT with M outputs).

In practice, the function in (1) itself needs to be determined through measurements of the device response by printing a number of patches with different M-tuples of control values and measuring them suitably to obtain the luminance under the different illuminants. The full spectrum of the patches may be measured for instance on a spectrophotometer from which the luminances may be computed using the spectral power distribution of the different illuminants and the visual luminance sensitivity function. The visual luminance sensitivity function might incorporate adjustments for the appropriate light level that account for visual phenomena such as the Purkinje effect. See for instance, G. Wyszecki and W. S. Stiles, *Color Science: Concepts and Methods, Quantitative Data and Formulae*, 2$^{nd}$ Ed., 1982, John Wiley and Sons, Inc., New York, N.Y., in particular pages 406-409.

Simplification According to a One Illuminant/One Colorant Interaction Assumption Several simplifications can be incorporated into the general framework above. Suppose first, that N=M and the colorants and lights are such that colorant i absorbs only illuminant $L_i$ and is completely transparent to all other colorants, then we have $f_i(A_1, A_2, \ldots A_M)$=function of $A_i$ alone=$f_i(0, 0, \ldots, 0, A_i, 0, \ldots 0) \equiv g_i(A_i) i=1,2, \ldots N$ (3)

The system of equations in (1) then reduces to M independent nonlinear equations one for each colorant under the corresponding illumination:

$g_i(B_i) = Y_i i = 1, 2, \ldots N$ (4)

The achievable gamut can be defined as follows. Let:

$$g_i^{min} = \min_{A_i} g_i(A_i) \quad (5)$$

$$g_i^{max} = \max_{A_i} g_i(A_i)$$

$h_i = [g_i^{min}, g_i^{max}]$ = the interval of luminances from $g_i^{min}$ to $g_i^{max}$ where i = 1, 2, ... N $G_1$=achievable gamut under assumption of one illuminant interacting with only one colorant=$h_1 \times h_2 \times \ldots \times h_N$ (6)

In other words, the achievable gamut is the product set of these individual luminance intervals. Note that the assumption in Eq. (6) is that the complete interval between the max and min limits can be realized without any "gaps" which would typically be expected with physical colorants. (For a definition of a product set, see for instance, Friedman, *The Foundations of Modern Analysis*, Dover, 1982, New York, N.Y.)

Under the assumption of one illuminant interacting with only one colorant, the multi-illuminant imaging characterization problem reduces significantly. Instead of requiring N-dimensional LUTs only one-dimensional LUTs—one per colorant are needed. The value of each colorant may be determined by the luminance under the corresponding illumination alone.

Alternative Simplifications

In practice, the assumption of one illuminant interacting with only one colorant does not hold for typical colorants. However, if the strongest interactions are between the ith illuminant and the ith colorant with other interactions having a smaller magnitude, the achievable gamut is a reduced N-dimensional region that is contained in $G_1$. Note that the situation of using cyan, magenta, and yellow colorants with red, green, and blue lights for illumination corresponds to this case, where the cyan interacts most with red, magenta with green, and yellow with blue. Note also that the use of a black colorant that (typically) absorbs all illuminants almost equally, does not satisfy the requirement of strong interaction with only one illuminant. In practice this implies that a black colorant should be viewed as an additional colorant, i.e., if one colorant is black we should have:

$N$=number of illuminants=number of images≤number of colorants$-1=M-1$

Black may, however, be used with other colorants in special situations (as is described in the examples below) and can help improve achievable gamut (i.e., improve dynamic range), simplify computation, and reduce cost.

Simplifications Based on Additive Density Models

The general technique described earlier requires a measurement of the device response in the M-dimensional input space of device control values, and the final characterization may be embodied in the form of multi-dimensional LUTs with N-dimensional inputs. In several cases, the measurement and storage/computation requirements for multi-illuminant color imaging can be significantly reduced by using simple models of the output processes. One useful model is to assume that the visual densities follow an additive model, i.e., $$d_i(A_1, A_2, \ldots A_M) \equiv -\log\left(\frac{f_i(A_1, A_2, \ldots A_M)}{f_i(0, 0, \ldots 0)}\right) \quad (7)$$

$$= -\sum_{j=1}^{M} \log\left(\frac{f_i(0, 0, \ldots, A_j, \ldots 0)}{f_i(0, 0, \ldots 0)}\right)$$

$$= -\sum_{j=1}^{M} d_i(A_j)$$

where $$d_i(A_j) \equiv -\log\left(\frac{f_i(0, 0, \ldots, A_j, \ldots 0)}{f_i(0, 0, \ldots 0)}\right) \quad (8)$$

(Traditionally, densities are defined as logarithms to the base 10, any other base can also be used in practice as it changes the densities only by a scale factor and does not impact any of the other mathematical development.) Note as per our convention, the control values $\{0,0,\ldots,0\}$ represent an blank paper substrate and therefore $f_i(0,0,\ldots 0)$ represents the luminance of the paper substrate under the ith illuminant, and the logarithmic terms represent paper normalized visual densities. The additive model for visual densities is motivated by the Beer-Bouguer law for transparent colorant materials and the assumption of relatively narrow band illumination, for which the additive nature of spectral density implies the approximation above is a valid one. The model also often provides a reasonable approximation for halftone media where the assumptions do not strictly hold. (For a more detailed background, see: F. Grum and C. J. Bartleson, Ed., *Optical Radiation Measurements: Color Measurement*, vol. 2, 1983, Academic Press, New York, N.Y. or G. Sharma and H. J. Trussell, "Digital Color Imaging", *IEEE Transactions on Image Processing*, vol. 6, No. 7, pp. 901-932, July 1997.) Full computations using a spectral density model might be performed if necessary to improve the model accuracy, this would be potentially advantageous in a situation where the illuminating lights are not strictly narrow band.

The terms $$d_i(A_j) \equiv \log\left(\frac{f_i(0, 0, \ldots, A_j, \ldots 0)}{f_i(0, 0, \ldots 0)}\right)$$

represent the paper normalized visual density of a patch printed with the jth colorant alone and no other colorants, with the control value for the jth colorant set as $A_j$. Therefore the additive density model proposed above allows the determination of the visual density of any patch based on the visual density of control patches of individual colorants. This reduces significantly the number of measurements required. Measurements of "step-wedges" of the individual colorants (for which other colorants are not printed) allow one to determine the functions $d_i(A_j)$ i=1,2, ... N, j=1, 2, ... M, from which the complete device characterization function can be determined using Eq. (8).

Using the above model, the system of equations in (1) reduces to:

$$\sum_{j=1}^{M} d_i(B_j) = \log(Y_i / Y_i^0) \text{ where } Y_i^0 = f_i(0, 0, \ldots 0) \quad (9)$$

The equations in (9) represent a system of K nonlinear equations in M variables $(B_1, B_2, \ldots B_M)$ The functions $d_i(A_j)$ are available from the measurements of the "step-wedges" and the above equations can be solved for the control values $B_j$ for luminance values within the gamut G, which was defined earlier. For points outside the gamut, the equations may be solved in an approximate sense providing a (less-controlled) form of gamut mapping.

Further simplification of these equations is possible by assuming that the densities in different spectral bands are linearly related, i.e., $$d_i(C) = \alpha_i^j d_j(C) \quad i=1,2, \ldots N \quad (10)$$

where $\alpha_i^j = d_i(C)/d_j(C)$ is the proportionality factor relating the visual density for the jth colorant under the ith illuminant to the visual density for the jth colorant under the jth illuminant and is assumed to be independent of the colorant value C, and $\alpha_j^j = 1$, Thus the convention adopted in Eq. (10)

is that the density of the jth colorant under all other illuminants is referenced to its density under the jth illuminant itself, which is not strictly a requirement of our model but is chosen because it results in a simplification of the notation alternate conventions could also be equivalently used. Equation (10) is also motivated by the Beer-Bouguer law for transparent colorant materials and the assumption of relatively narrow band illuminants. (For a more detailed background, refer to: F. Grum and C. J. Bartleson, Ed., *Optical Radiation Measurements: Color Measurement*, vol. 2, 1983, Academic Press, New York, N.Y. or G. Sharma and H. J. Trussell, "Digital Color Imaging", *IEEE Transactions on Image Processing*, vol. 6, No. 7, pp. 901-932, July 1997.) Even though a number of colorants and marking processes do not follow the Beer-Bouguer law exactly, in practice, Eq. (10) often provides a reasonably accurate empirical model for measured data and may be used for the purposes of the current invention. With the simplification of (10) the system of equations in (9) reduces to a linear system of equations:

$$\sum_{j=1}^{M} \alpha_i^j d_j(B_j) = \log(Y_i/Y_i^0) \quad i = 1, 2, \ldots N \quad (11)$$

which can be written in matrix-vector notation as $$Ad = t \quad (12)$$

where A is the N×M matrix whose ij th element is $\alpha_i^j$, d is M×1 the vector whose jth component is $d_j(B_j)$ and t is the N×1 vector whose ith component is $\log(Y_i/Y_i^0)$.

The system of linear equations can be solved to determine a value of d, which provides the desired luminance values under the different illuminants (corresponding to the multiplexed images). The individual components of d, i.e., the $d_j(B_j)$ values can then be used with the visual density response for the jth colorant under the jth illuminant to determine the control value corresponding to the jth colorant, i.e., $B_j$. This process is analogous to inverting a one-dimensional tone reproduction curve (1-D TRC). Repeating the process for each colorant provides the complete set of colorant control values required by $\{B_j\}_{j=1}^{M}$ that produce the desired set of luminance values under the different illuminants.

Note that if N=M, the above set of equations has a unique solution provided A is invertable, which is normally the case for typical colorants and illuminants. The solution in this case is obtained simply by inverting the matrix A. Furthermore, if the colorants and illuminants can be ordered in correspondence, i.e., colorant i absorbs illuminant i most and the other illuminants to a lesser extent, then $\alpha_i^j \leq \alpha_j^j = 1$, for all i=1,2, ... N, i.e., the matrix A is square with the elements along the diagonal as the largest along each row, which is often desirable from a numerical stability standpoint. If M>N the system of equations will have multiple mathematical solutions, and the choice of a particular solution may be governed by additional criteria. One example of a criterion for choosing among the multiple mathematical solutions is feasibility, a feasible solution being a set of density values that can be realized with the range of colorant control values exercisable.

The model inherent in Eq. (12) can also be used to determine suitable approximations to the achievable gamut G and can be of assistance in performing gamut mapping. Typically, the density curves $d_j(C)$ are monotonically increasing functions of the colorant control value C and the achievable range of densities for the jth colorant under the jth illuminant is between $d_j^{min} = d_j(0) = 0$ and $d_j^{max} = d_j(C_j^{max})$ where $C_j^{max}$ is the maximum control value for the jth colorant. The achievable gamut assuming the model of Eq. (12) is valid is $$G_D = \text{achievable luminance gamut assuming additive densities} \quad (13)$$

$$= \begin{cases} y \text{ such that there exists a } d \text{ with } Ad = \log(y/y^0) \text{ and} \\ 0 = d^{min} \leq d \leq d^{max} \end{cases}$$

where $d^{min}$ is an M×1 vector whose jth component is $d_j^{min} = 0$, and $d^{max}$ is an M×1 vector whose jth component is $d_j^{max}$, y is an N×1 vector whose ith component represents the luminance under the ith illuminant $L_i$, and $y^0$ is a N×1 vector whose ith component represents the paper luminance under the ith illuminant. The inequalities, the division, and the logarithm in the right hand side of Eq. (13) are understood to be applicable on a term-by-term basis for the vectors.

The N images to be produced under the N illuminants provide a N-tuple for each pixel location corresponding to the desired luminance values at that pixel location under the N illuminants. The N-tuples corresponding to all the pixel locations must lie within the gamut G defined earlier in order for the image to be producible using the given colorants and illuminants. If images specified for multiplexing do not satisfy this constraint some form of gamut mapping is necessary.

A simple image-independent gamut mapping scheme may be defined as follows. First, ranges of luminance values under the different illuminants are determined such that all possible values within these ranges lie within the gamut G. This is mathematically equivalent to stating that we determine a set of N-intervals $S_i = [Y_i^{min}, Y_i^{max}]$, i=1,2, ... N such that the product set of these intervals is contained within the gamut G, i.e., $$S_1 \times S_2 \times S_3 \times \ldots \times S_N \subseteq G \quad (14)$$

The gamut mapping may then be performed on an image independent basis by mapping the set of requested luminance values under the ith illuminant to the interval $S_i = [Y_i^{min}, Y_i^{max}]$ by some (typically monotonous) function. The interval $S_i$ determines the luminance dynamic range achieved under the ith illuminant. Since there are typically multiple choices of the sets $\{S_i\}_{i=1}^{N}$ for which Eq. (14) is valid, one method for selecting the intervals may be by using a max min optimization where we maximize the minimum dynamic range achievable. Mathematically, this approach can be described as follows: Select the sets $\{S_i\}_{i=1}^{N}$ such that $\min_i f(S_i)$ is maximized, where $f(S_i)$ is some suitably chosen function that measures the contrast achieved corresponding to the luminance range $S_i$. Examples of suitable choices of the function $f(\,)$ are simple luminance ratio i.e., $f(S_i) = Y_i^{max}/Y_i^{min}$, or density range $f(S_i) = \log(Y_i^{max}/Y_i^{min})$, or CIE lightness range $f(S_i) = L^*(Y_i^{max}) - L^*(Y_i^{min})$, where $L^*(\,)$ is the CIE lightness function. (See for instance, G. Wyszecki and W. S. Stiles, *Color Science: Concepts and Methods, Quantitative Data and Formulae*, 2$^{nd}$ Ed., 1982, John Wiley and Sons, Inc., New York, N.Y.) Note that the choice of the density range as the function in the max-min optimization along with the model of Eq.(13) reduces this to a linear max-min optimization problem with box constraints that can be solved using numerical optimization schemes.

Illustrated Embodiments of the Invention

For a general understanding of the present invention, reference is made to the drawings. In the drawings, like reference numerals have been used throughout to designate identical elements.

Figure 3:
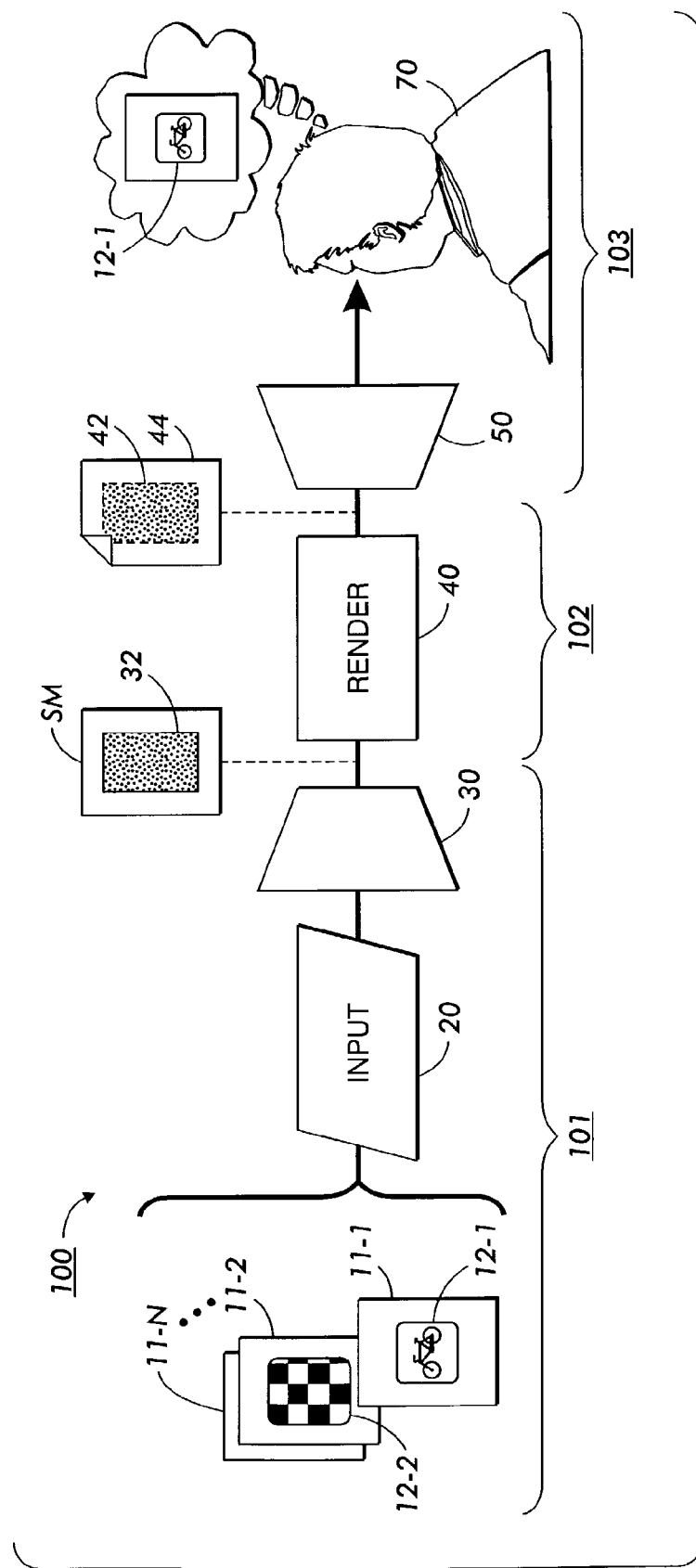
FIG. 3 is a block diagram of systems for spectral multiplexing and demultiplexing of plural source images, and for rendering a composite image having therein at least one encoded source image, constructed according to the invention.

FIG. 3 illustrates a system 100 operable in a first mode for spectrally multiplexing a plurality of source images to form a composite image, in a second mode for rendering the composite image, or in a third mode for demultiplexing the spectrally multiplexed composite image so as to recover at least one of the plurality of source images for advantageous viewing by an observer.

As shown in FIG. 3, a plurality of disparate source image arrays 11-1, 11-2, . . . 11-N are presented to an image input device 20 in a spectral multiplexing system 101. Image input device 20 may be equipped to receive plural monochromatic images or a combination of monochromatic and multichromatic images. Image input device 20 may include an image capture device such as a digital scanner coupled to a random access memory, or any type of analog or digital camera coupled to a storage means such as a computer memory or a magnetic or optical recording medium. Image input device 20 may also include means for receiving an image that had previously been stored in a random access memory, on video tape, or a laser-encoded disk, etc., or for receiving an image created by a computer image generator, or an image encoded in an appropriate format and transmitted on a network.

The illustrative representation of the plural source images in respective image arrays received by the image input device 20 in this example includes a first source image 12-1 represented in a first source image array 11-1 and a second source image 12-2 represented in a second source image array 11-2. The system 101 can optionally receive N source images which are represented in a respective image arrays. In this exemplary embodiment of the invention, disparate pictorial source images are employed and at least one of the plural source images is intended for ultimate recovery (via spectral demultiplexing) from a composite image.

Once the source image data is received in the input image device 20, it is presented to a spectral multiplexer 30, which encodes a data representation of a composite of at least the first and second source images, so as to provide a composite image 32 on an spectrally multiplexed (SM) image plane. Such encoding may proceed in one embodiment with mapping for every pixel location, or by mapping in localized areas rather than specific pixels, to the composite image 32, so as to multiplex the information necessary for encoding of each corresponding pixel located in each source image.

Next, according to operation of a composite image rendering system 102, data representative of the composite image is provided to a rendering device 40, which can be connected to the spectral multiplexer 30 by any one of a variety of suitable means for transmitting or storing electronic information. The rendering device 40 records the composite image 32 on a substrate 44 with use of a predetermined array of narrow band colorants, so as to form a rendered composite image 42. The rendered composite image 42 is thereby fixed on the substrate 44.

The rendered composite image 42 is available for viewing in ambient light by an observer 70. Although the rendered composite image 42 is representative of data encoded in the spectrally multiplexed plane using the method of the invention, the rendered composite image 42 typically exhibits a confused appearance under conventional ambient lighting conditions; at least one of the source images 12-1, 12-2, etc. is thus difficult or impossible to distinguish under conventional ambient lighting conditions. A particular source image is made difficult or impossible to distinguish until a demultiplexer 50 is operated to selectively illuminate the composite image 42 in a manner sufficient to reveal the desired source image. Alternatively, one or more of the source images may be encoded so as avoid visual confusion and therefore be visually apparent in the rendered composite image when the rendered composite image is subjected to ambient or wide band illumination, and become confused or difficult to detect when the rendered composite image is subjected to a complementary narrow band illuminant.

According to operation of a spectral demultiplexing system 103, a particular source image (as shown in FIG. 3, source image 12-1) may be recovered and made distinguishable within the composite image 42. In the embodiment illustrated in FIG. 3, the output of the demultiplexer 50 is directed to an observer 70 using the method of the invention. The recovered image is then distinguishable by the observer 70 as one substantially identical with, or a close approximation of, the particular source image 12-1 initially provided to the image input device 20.

Recovery of a particular source image will be understood to generally proceed according to an exemplary embodiment of the spectral demultiplexing system 103 as follows. The substrate 44 is positioned with respect to an illuminant source operable within the demultiplexer 50, such that a narrow band illuminant generated by the demultiplexer 50 illuminates the composite image 42 so as to subject the array of colorants in the rendered composite image 42 to the selected illuminant. As a result of the rendered composite image 42 thus being controllably and selectively illuminated by at least one illuminant, a desired source image is then detectable. In the illustrated embodiment, the desired source image is made visually distinguishable to an observer 70. The desired source image 12-1, now recovered, is thereby susceptible to comprehension by an observer 70.

Accordingly, by virtue of the aforementioned interaction of a colorant and its corresponding illuminant, and due to the visual response of the observer 70 to this particular interaction, each encoded source image may be present as a confused, or distinguishable, image depending upon the objective of the demultiplexing operation.

Figure 4:
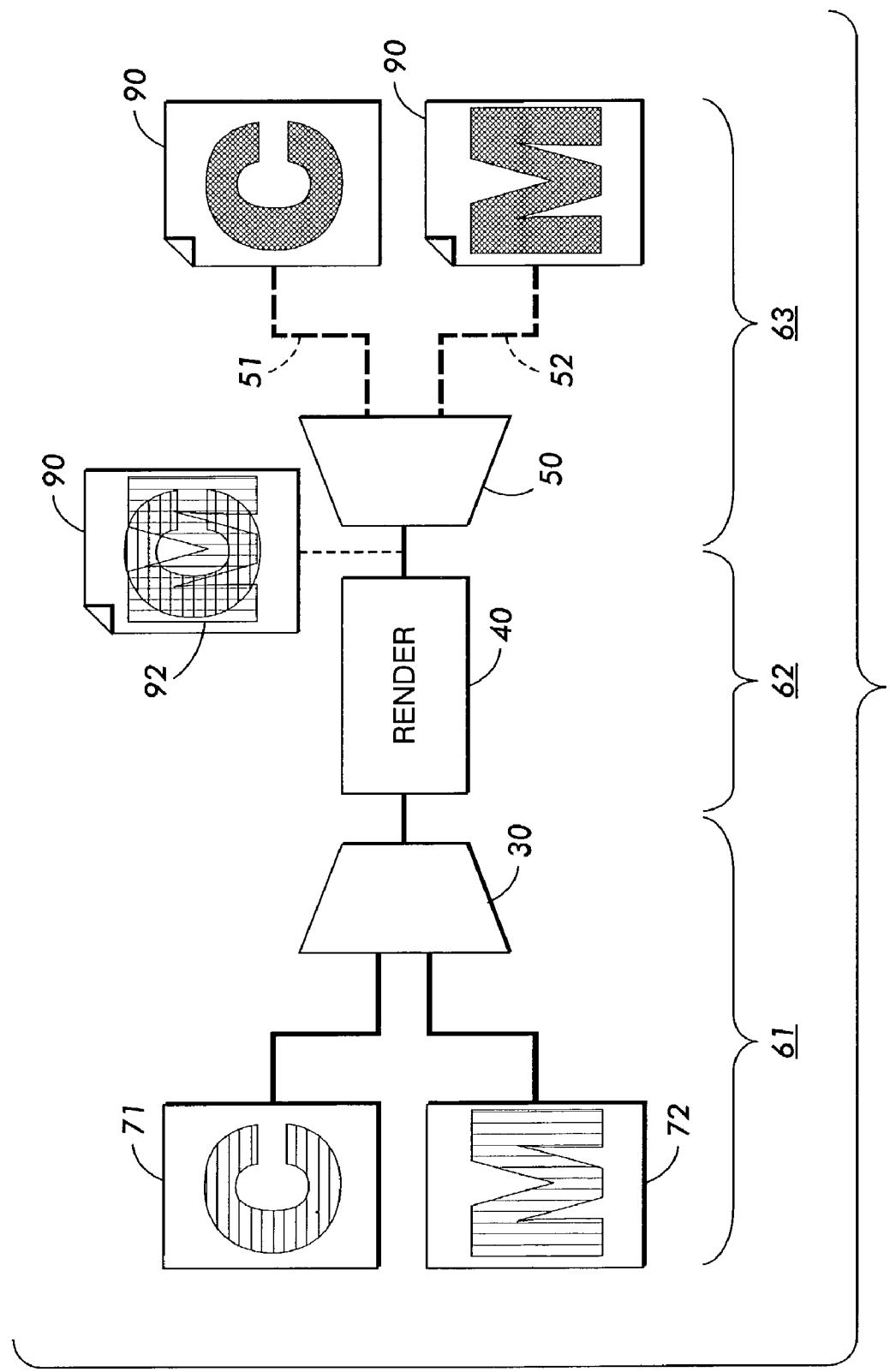
FIG. 4 is a simplified schematic diagram of methods operable in the system of FIG. 3 for spectrally multiplexing first and second source images in a composite image, rendering the composite image with use of respective first and second colorants, and for demultiplexing the rendered composite image.

FIG. 4 is a simplified schematic diagram of exemplary embodiments of spectral multiplexing, rendering, and spectral demultiplexing methods 61, 62, 63, respectively. In step 61 for multiplexing plural source images, a first source image 71 and a second source image 72 are provided to the multiplexer 30, which outputs a composite image data file to a rendering device 40. The output of the rendering device 40 is substrate 90 which has incorporated therein a composite image 92. The original source image 71 is rendered as a pattern using a first colorant; in the illustrated embodiment, a cyan ink or toner is chosen. The second source image 72 is rendered as a pattern using a second colorant; in the illustrated embodiment, a magenta ink or toner is chosen. (As there is typically some overlap in absorption bands between practical narrow band colorants, the two source images are preferably encoded in step 61 to account for the absorption that will occur when plural colorants are utilized to produce the composite image.)

In a rendering step 62, the composite image specifies patterns in cyan and magenta colorants that are accordingly rendered on a substrate 90 to form the rendered composite image 92. Those skilled in the art will appreciate that certain portions of the two patterns may be co-located and other portions are relatively spatially distinct. Nonetheless, in certain embodiments of the present invention, visual recognition of at least one of the source images in the composite image may be made difficult or impossible due to the confusion between source images that are encoded in the composite image.

In step 63 for demultiplexing the rendered composite image 92, the substrate 90 having the rendered composite image 92 fixed thereon is illuminated by the demultiplexer 50. Controlled illumination of the substrate 90 according to a first mode 51 of illumination causes the first source image 71 to achieve a particular level of density with respect to the remainder of the composite image and thus the first source image 71 becomes detectable on the substrate 90. Alternatively, controlled illumination of the substrate 90 according to a second mode 52 of illumination causes the second source image 72 to be similarly detectable on the substrate 90. In the illustrated embodiments, the first source image 71 and the second source image 72 are therefore selectably distinguishable on the substrate 90.

Figure 5:
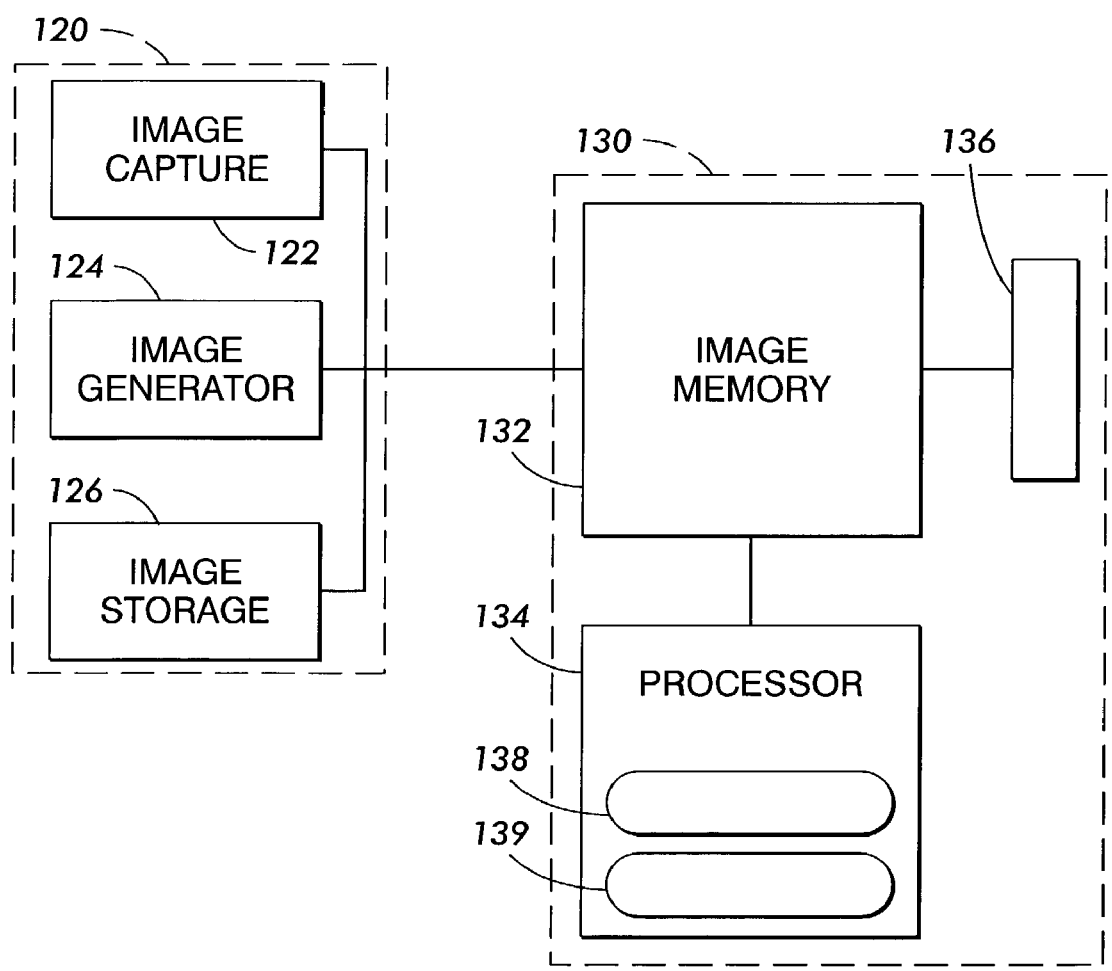
FIG. 5 is a schematic simplified representation of the spectral multiplexing system of FIG. 3, in which an image processing unit and associated peripheral devices and subsystems are employed.

FIG. 5 illustrates a schematic simplified representation of the spectral multiplexing system 101 of FIG. 3, in which an image processing unit 130 and associated peripheral devices and subsystems are employed. An image input terminal 120 may include an image capture device 122 such as a scanner, digital camera, or image sensor array; a computer image generator 124 or similar device that converts 2-D data to an image; or an image storage device 126 such as a semiconductor memory or a magnetic, optical, or magneto-optical data storage device. The image input terminal 120 derives or delivers digital image data in the form of, for example, plural monochromatic image files, wherein the picture elements or "pixels" of each image are defined at some gray value. For example, the input terminal 120 may be employed to derive an electronic representation of, for example a document or photograph from image capture device 122, in a format related to the physical characteristics of the device, and commonly with pixels defined at m bits per pixel. If a color document, the image is defined with two or more separation bitmaps, usually with identical resolution and pixel depth. Image data from the input terminal 120 is directed to an image processing unit (IPU) 130 for processing so as to be encoded to create a composite image. It will be recognized that the data representing one or more source images is spectrally encoded by the image processing unit 130 to provide secondary image data representative of a composite image suitable for subsequent rendering.

The image processing unit 130 may include image memory 132 which receives input image data from image input terminal 120 or from another suitable image data source, such as an appropriately programmed general purpose computer (not shown) and stores the input image data in suitable devices such as random access memory (RAM). Image processing unit 130 commonly includes processor 134. The input image data may be processed via a processor 134 to provide image data representative of plural source images defined on respective source image planes in accordance with the present invention. For example, image data signals in the form of RGB or black and white (B/W) images may be processed, and the luminance information derived therefrom may be used to provide data representative of a source image. Image data signals presented in other formats are similarly processed: image data signals in, for example the L*a*b format, may be processed to obtain data representing a source image from the lightness channel. Image data signals that are already formatted in grayscale are generally usable without further processing.

Operation of the image processing unit 130 may proceed according to one or more image processing functions 138, 139 so as to encode the source image data into the composite image file as described hereinabove. Processing may include a color conversion which, if necessary, may be implemented to convert a three component color description to the printer-specific four or more component color description, and may include a halftoner which converts a c bit digital image signals to d bit digital image signals, suitable for driving a particular printer, where c and d are integer values. In certain embodiments, additional functions may include one or more of color space transformation, color correction, gamut mapping, and under color removal (UCR)/gray component replacement (GCR) functions. Control signals and composite image output data are provided to an interface 136 for output from the image processing unit 130.

The image processing unit 130 may be embodied as an embedded processor, or as part of a general purpose computer. It may include special purpose hardware such as for accomplishing digital signal processing, or merely represent appropriate programs running on a general purpose computer. It may also represent one or more special purpose programs running on a remote computer.

Figure 6:
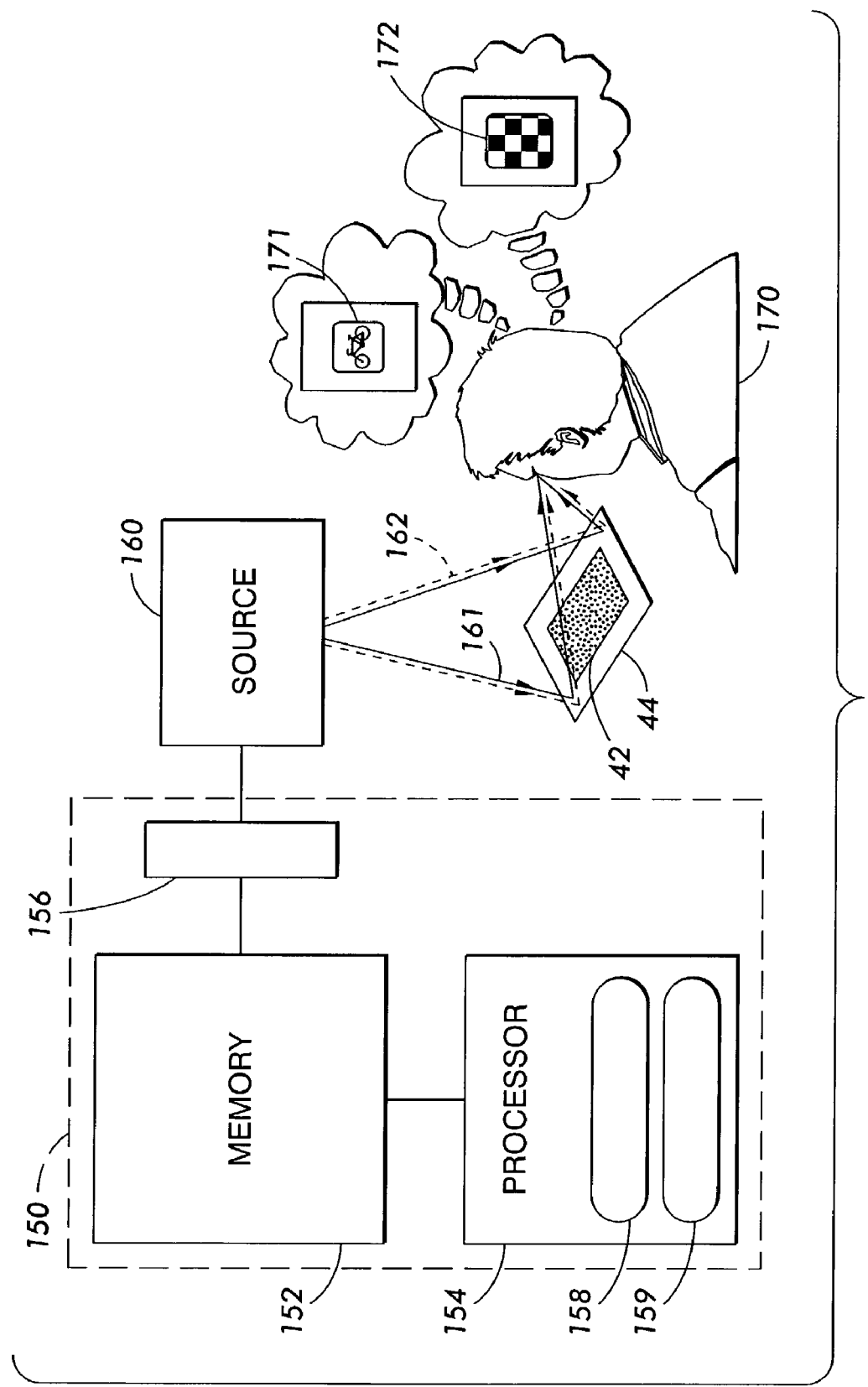
FIG. 6 is a simplified schematic representation of the spectral demultiplexing system of FIG. 3, in which a controller and associated peripheral devices and subsystems are employed.

FIG. 6 is a simplified schematic representation of the spectral demultiplexing system 103 of FIG. 3, in which a controller and associated peripheral devices and subsystems are employed to present one or more recovered source images 171, 172.

FIG. 6 shows a controller 150 connected to a illuminant source 160 that is operable for subjecting the composite image 42 on substrate 44 to first and second predefined illuminants 161, 162. Firstly, as illustrated with reference to the rendered composite image 42 on substrate 44, under conventional ambient lighting and in the absence of an illuminant 161, 162, only the composite image 42 is distinguishable and no source image is detected. However, upon activation of the source 160 so as to provide the first predefined illuminant 161, the recovered source image 171 becomes detectable to an observer 170. Alternatively, the mode of operation of the source 160 may be switched so as to provide a second predefined illuminant 162, whereupon the composite image 42 is instead subjected to the second illuminant 162, and the recovered source image 172 becomes detectable.

In its simplest form the controller 150 may be constructed as a manually-operable illuminant selector switch. Alternatively, as illustrated, the controller 150 may be provided in the form of a computer-based control device having an interface 156 connected to source 160, which offers programmable control of the operation of the illuminant source 160. The controller 150 may thus be operated to cause selective activation and deactivation of the illuminant source 160 so as to provide one or more selected fields of illumination 161, 162. Such control may, for example, the accomplished via manual operation of the illuminant source 160 by a human operator, or by programmable control afforded by a computer or similar means.

The controller 150 is operable for accomplishing tasks such as activation, deactivation, or sequencing of the illuminant source 160, setting illuminant intensity, illuminant frequency, etc. Embodiments of the controller 150 benefit from operation of a programmable control system comprising standard memory 152 and processor 154. The controller 150 may be employed, for example, for supplying uniform R or G or B screen images to the interface 156 for subsequent display on the illuminant source 160 when the latter is constructed in the form of a CRT monitor.

Operation of the illuminant source 160 by the controller 150 may proceed according to certain sequenced control functions 158, 159 so as to provide, for example, controlled operation of the illuminant source 160 to afford a field of illumination that varies according to selective characteristics such as a sequential activation and deactivation of selected narrow band illuminants, or of controlled operation of the intensity of same; or with interactive control according to intervention by an operator of the particular sequence, intensity, or duration of the illuminants. As noted above, the rendered composite image may be constructed to have a plurality of source images encoded therein; for example, of at least first and second patterns of respective first and second colorants. The rendered composite image may be subjected to a temporal sequencing of illumination by respective first and second narrow band illuminants, thus allowing a respective one of the first and second recovered source images 171, 172 to be sequentially distinguishable.

As mentioned, the illuminant source 160 may be provided in the form of a CRT monitor having a screen positionable with respect to the substrate 44 for generating the requisite field of illumination sufficient to illuminate the rendered composite image 42. By way of example, the following description gives an example of control settings for generating a controlled field of illumination from a CRT monitor under the control of a desktop computer using a document presentation application, such as Microsoft PowerPoint. On a blank slide, a rectangle object is created that completely covers the extent of the landscape page. Using the menu selections, the user selects "Format AutoShape", then "Colors and Lines". A custom slide color may be specified. For example, to create a red slide, set Red to 255, Green to 0, Blue to 0. To create a green slide, set Red to 0, Green to 255, Blue to 0. To create a blue slide, set Red to 0, Green to 0, Blue to 255.

The advantageous use of a noise component, such as a noise signal or a noise image, in the encoding process described herein has been found to reduce the visibility of artifacts of residual images. Typically, the masked source image is a residual image, i.e., a source image other than the source image intended to be recovered when the rendered composite image is subjected to a predefined complementary illuminant. The addition of a noise component to the encoding process is particularly advantageous when the source image to be recovered exhibits a relatively large uniform region, wherein artifacts of a residual source image may be more noticeable when the rendered composite image is subjected to a predefined viewing illuminant. A basic discussion of the optical masking properties of noise that occurs in images can be found, for instance, in Wandell, *Foundations of Vision*, Sinauer Assoc., 1995.

In one embodiment of the invention, a noise component is introduced in the encoding of the plurality of source images that forms the composite image so as to mask (i.e., reduce the detectability of) at least one of the source images during spectral demultiplexing.

In another embodiment with the invention, a noise component may be introduced to one or more of the source images prior to or during spectral multiplexing.

In another embodiment of the invention, a source image, provided in the form of a noise image, is included in the plurality of source images to be encoded. One example of a source image provided in the form of the noise image is a white noise image. Alternatively, the frequency content or complexity of the noise image may be designed, for example, to exhibit a spectral profile similar to the spectral profile of the source image to be masked.

In another embodiment of the invention, a noise signal may be added to the K channel of the composite image in units of density. Addition of the noise in density units ensures that the noise is roughly at the same visual level at all gray levels (due to Weber's Law). The application of this technique will be understood by comparing the rendered composite images provided in FIGS. 7 and 8.

Figure 7:
FIG. 7 is a rendered composite image printed using cyan and black.

FIG. 7 is a rendered composite image printed using a source image encoded in cyan and black. The source image is expected to be visible under red illumination and to fade to a uniform background under blue illumination. However, when the image is viewed carefully under blue illumination, a faint residual of the image is detectable due to, for example, variations in gloss and small errors in calibration.

Figure 8:
FIG. 8 is a rendered composite image printed using cyan and black using the source image employed in the creation of FIG. 7, wherein the rendered composite image benefited from the addition of noise in the K channel during spectral multiplexing of the source image.

FIG. 8 is an example of the source image of FIG. 7 rendered using cyan and black, and with noise added in the K channel at a level corresponding to a random density variation of 0.2 density units. When FIG. 8 is viewed under blue illumination, the visibility of the source image is greatly reduced in comparison to that of FIG. 7.

Note that the noise masking technique described herein can be applied generally to mask a variety of undesirable image artifacts, such as texture or gloss variations that may occur in certain combinations of colorants or illuminants.

The noise masking technique described herein will also find utility in certain applications of the invention wherein one or more of the source images is spectrally multiplexed so as to less than fully detectable (such as an image which disappears to a uniform background) when the rendered composite image is subjected to a specific illuminant.

Note that one skilled in the art may realize a variety of alternatives are within the scope of this invention for implementing the above described embodiments. Its advantageous use is expected in color printing by various processes including offset lithography, letterpress, gravure, xerography, photography, and any other color reproduction process which uses a defined number of colorants, usually three or four, in various mixtures. Embodiments of the rendering system 102 include apparatus capable of depositing or integrating a defined array of colorants in a substrate, according to the composite image, such that the array of colorants is susceptible to selective reflection or transmission of a selected narrow band illuminant incident thereon. For example, the composite image may be rendered on a transparent film and a desired source image may be recovered when the substrate is backlit by a suitable narrow band illuminant. Examples include hardcopy reprographic devices such as inkjet, dye sublimation, and xerographic printers, lithographic printing systems, silk-screening systems, and photographic printing apparatus; systems for imagewise deposition of discrete quantities of a color on a substrate surface, such as paint, chemical, and film deposition systems; and systems for integration of colorant materials in an exposed surface of a substrate, such as textile printing systems.

Embodiments of exemplary substrates include, but are not limited to, materials such as paper, cardboard, and other pulp-based and printed packaging products, glass; plastic; laminated or fibrous compositions; and textiles. Narrow band colorants other than basic CMYK colorants may also be used for this invention.

The field of illumination for illuminating a rendered composite image may be provided by a variety of illuminant sources that include a narrow band light source responsive to manual control or to program control according to an illuminant source control signal. Various narrow band light sources may include apparatus for providing filtered sunlight, filtered incandescent, or filtered fluorescent light; coherent light sources such as a solid-state laser or laser diode; projection or image display devices such as those incorporating a cathode ray tube (CRT), flat-panel display (FPD), liquid crystal display (LCD), plasma display, or light emitting diode (LED) and organic light emitting (OLED) arrays. Light sources incorporating a cathode ray tube are advantageous in that they have phosphors that exhibit stable and well-understood spectral characteristics that are sufficiently narrow and complementary to common CMY colorants. In addition, such displays are widely available.

Additional familiar components (not shown) may be included such as a keyboard, and a mouse, means for reading data storage media, a speaker for providing aural cues and other information to the observer, and adapters for connection of the systems described herein to a network medium. Computer readable media such as memory, hard disks, CD-ROMs, flash memory, and the like may be used to store a computer program including computer code that implements the control sequences pertinent to present invention. Other systems suitable for use with the present invention may include additional or fewer subsystems.

Embodiments of the invention are contemplated for providing visual stimulation and amusement, particularly by the inclusion of composite images in printed materials such as books or posters, in novelty items, and in software sold to consumers for generating such items. Rendered composite images made using this invention can be distributed to consumers for subsequent demultiplexing when exposed to a field of illumination generated by, for example, a display device connected to a computer according to display control signals directed to the computer from a remote source, such as from an internet site, or according to display control instructions embedded in electronic mail, Internet web pages, or similar transmissions.

Embodiments of the invention may be employed for drawing the attention of an observer to a particular source of information, such as for disseminating news, entertainment, or advertising, or to messages or indicia, such as trademarks or product instructions, on objects; to graphics, art work, and the like displayed at gathering places such cinemas, galleries, museums, commercial venues, and trade shows; or to large-format displays such as signs, posters, billboards, or murals. Still other embodiments of the invention are contemplated for use in publications, merchandising, or advertising vehicles such as newspapers, periodicals, or maps; in boxes, bottles, containers, wrappers, labels, or other packaging or shipping materials; in building materials including wall coverings, floor coverings, lighting systems, and the like.

Other embodiments of the invention are contemplated for implementing specialized visual effects in a public setting, a performance or entertainment venue, or other gathering place where there is control of the ambient lighting. Examples are festivals, theaters, night clubs, and sporting events, where participants may receive printed materials or packaging, clothing, souvenirs, etc. having incorporated thereon one or more rendered composite images. Under the influence of localized fields of illumination provided by suitably-modified zone lighting equipment, such as stage lighting equipment, which may be synchronized or otherwise controlled, a variety of source images having visual interest to the participants may be made visible in a dramatic fashion.

Other embodiments of the invention are contemplated for implementing secure verification of authenticity of a document or other instrument. Such embedded information may be present in the form of a watermark, an indice, or an image useful for validation, secure identification, or the like. For example, the appearance of a single image or an unchanging (i.e. constant) image viewed under specific, controlled illumination could be used to indicate authenticity of a document. Fraudulent attempts to circumvent the verification, such as by proffering a photocopy or counterfeit of the requisite instrument, may not meet the printer calibration settings necessary for generating an authentic composite image, such that a confused appearance of a composite image on a counterfeit under the controlled lighting would preclude authenticity. Embodiments of the invention are contemplated for providing simple encryption and decryption of embedded information in documents, coupons, game pieces, tickets, certificates, commercial paper, currency, identification cards, and the like.

Still other embodiments of the invention are contemplated for use in textiles and garments such as head coverings, clothing, and outerwear, and in other wearable or personal items such as footwear, timepieces, eyewear, jewelry, appliques, fashion accessories, and the like. Items bearing composite images generated in the course of the practice of this invention may have an artistic, novelty, or collectible nature, such as in a souvenir, book, magazine, poster, educational material, trading card, or toy.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method of processing a plurality of source images to provide a composite image suitable for rendering as a rendered composite image, comprising the steps of:
   receiving the plurality of source images;
   adding a noise component to at least one of the source images; and
   encoding the plurality of source images to thereby provide the composite image;
   wherein the encoding includes mapping of source image values at pixel locations in the source images to colorant control values at respective pixel locations in a spectrally-multiplexed image plane, wherein the colorant control values specify an amount of each one of a plurality of M colorants to be deposited at corresponding locations in the rendered composite image,
   wherein the mapping of the pixel values from the plurality of source images is determined according to a plurality of spatial luminance distributions each of which representing the desired response of the rendered composite image to illumination thereof by a respective one of a plurality of N narrow band illuminants, and
   wherein the mapping of the pixel values from the plurality of source images is calculated to cause a selected one of the source images to be recovered when the rendered composite image is subject to illumination by at least a selected one of the N narrow band illuminants.

2. The method of claim 1, wherein the addition of the noise component is combined with the encoding of the plurality of source images.

3. The method of claim 1, wherein the addition of the noise component further comprises providing a noise image in the plurality of source images.

4. The method of claim 1, wherein the addition of the noise component further comprises addition of a noise signal to at least one of the source images.

5. The method of claim 1 wherein a distribution of the noise component is determined according to a spectral profile of a selected one of the source images.

6. The method of claim 1, wherein the mapping of pixel values further comprises adjusting the colorant control values to compensate for unwanted absorption of at least one of the N narrow band illuminants by at least one of the M colorants.

7. The method of claim 1, wherein at least one of the colorants is selected from the group consisting of cyan, magenta, yellow, and black colorants, and at least one of the narrow band illuminants is selected from the group consisting of red, green, and blue narrow band illuminants.

8. The method of claim 1, wherein the mapping of pixel values further comprises adjusting the colorant control values to produce first and second spatial luminance distributions when the rendered composite image is subjected to respective first and second narrow band illuminants, the first spatial luminance distribution having a constant density, and the second spatial luminance distribution having a spatially-varying density.

9. The method of claim 1, wherein the mapping of pixel values further comprises a gamut mapping step to limit the mapping to a predetermined system gamut according to a determination of realizable luminance values.

10. The method of claim 1 further comprising the step of rendering the composite image to produce the rendered composite image on a substrate.

11. The method of claim 10, wherein the rendering is performed by a hardcopy reprographic device selected from the group consisting of: inkjet, dye sublimation, electrophotographic, xerographic, photographic, lithographic, offset, letterpress, and gravure printing apparatus.

12. An article of manufacture, comprising a substrate having rendered thereon a rendered composite image, produced according to the method of claim 10.

13. An imaging system for receiving image data representative of plural source images and for processing the image data to thereby provide a composite image in a form suitable for rendering as a rendered composite image, comprising:
an image processing unit for receiving the plurality of source images and for encoding the plurality of source images to thereby provide the composite image;
wherein the encoding includes addition of a noise component to at least one of the plurality of source images, and mapping of source image values at pixel locations in the source images to colorant control values at respective pixel locations in a spectrally-multiplexed image plane;
wherein the colorant control values specify an amount of each one of a plurality M of colorants to be deposited at corresponding locations in the rendered composite image; and
wherein the mapping of the pixel values from the plurality of source images is determined according to a plurality of spatial luminance distributions each of which representing the desired response of the rendered composite image to illumination thereof by a respective one of a plurality of N narrow band illuminants, and the mapping of the pixel values is calculated to cause a selected one of the source images to be recovered when the rendered composite image is subject to illumination by at least a selected one of the N narrow band illuminants; and
an interface for providing the composite image.

14. The imaging system of claim 13, wherein the addition of the noise component further comprises provision of a noise image in the plurality of source images to be encoded.

15. The imaging system of claim 13, wherein the addition of the noise component further comprises addition of a noise signal to at least one of the source images.

16. The imaging system of claim 13, further comprising an image rendering device for receiving the composite image and for rendering the composite image on a substrate to provide the rendered composite image.

17. The imaging system of claim 16, further comprising a demultiplexer for subjecting the rendered composite image to illumination by the selected narrow band illuminant so as to recover the selected source image.

18. A computer readable medium storing a computer program, the program being executable for receiving image data representative of plural source images and for processing the image data to thereby provide a composite image suitable for rendering as a rendered composite image, comprising the steps of:
receiving the plurality of source images;
adding a noise component to at least one of the source images; and
encoding the plurality of source images to thereby provide the composite image;
wherein the encoding includes mapping of source image values at pixel locations in the source images to colorant control values at respective pixel locations in a spectrally-multiplexed image plane, wherein the colorant control values specify an amount of each one of a plurality of M colorants to be deposited at corresponding locations in the rendered composite image,
wherein the mapping of the pixel values from the plurality of source images is determined according to a plurality of spatial luminance distributions each of which representing the desired response of the rendered composite image to illumination thereof by a respective one of a plurality of N narrow band illuminants, and
wherein the mapping of the pixel values from the plurality of source images is calculated to cause a selected source image to be recovered when the rendered composite image is subject to illumination by at least a selected one of the N narrow band illuminants.

19. The computer readable medium storing the program of claim 18, wherein the addition of the noise component is combined with the encoding of the plurality of source images.

20. The computer readable medium storing the program of claim 18, wherein the addition of the noise component is obtained by providing a noise image in the plurality of source images.

21. The computer readable medium storing the program of claim 18, wherein the addition of the noise component further comprises addition of a noise signal to at least one of the source images.

22. The computer readable medium storing the program of claim 18, wherein a distribution of the noise component is determined according to a spectral profile of a selected one of the source images.

23. The computer readable medium storing the program of claim 18, wherein the mapping of pixel values includes adjusting the colorant control values to compensate for unwanted absorption of at least one of the narrow band illuminants by at least one of the colorants.

24. The computer readable medium storing the program of claim 18, wherein the mapping of pixel values includes adjusting the colorant control values to produce first and second spatial luminance distributions when the rendered composite image is subjected to respective first and second narrow band illuminants, the first spatial luminance distribution having a constant density, and the second spatial luminance distribution having a spatially-varying density.

25. The computer readable medium storing the program of claim 18, wherein the mapping of pixel values includes a gamut mapping step to limit the mapping to a predetermined system gamut according to a determination of realizable luminance values.

26. The computer readable medium storing the program of claim 18, further comprising the step of initiating transmission of the composite image to an image rendering device suitable for rendering the composite image on a substrate.

* * * * *